United States Patent
Wallace et al.

(10) Patent No.: US 11,532,032 B2
(45) Date of Patent: Dec. 20, 2022

(54) LOCATION SENSITIVE QUEUES MANAGEMENT

(71) Applicant: Radius Networks Inc., Washington, DC (US)

(72) Inventors: Marc Wallace, Arlington, VA (US); Christopher Sexton, McLean, VA (US); Aaron Kromer, Silver Spring, MD (US); Scott Newman, Aurora, CO (US)

(73) Assignee: Radius Networks, Inc., Washington, DC (US)

( * ) Notice: Subject to any disclaimer, the term of this patent is extended or adjusted under 35 U.S.C. 154(b) by 0 days.

(21) Appl. No.: 16/265,786

(22) Filed: Feb. 1, 2019

(65) Prior Publication Data
US 2020/0250737 A1 Aug. 6, 2020

(51) Int. Cl.
*G06Q 30/06* (2012.01)
*G06Q 10/08* (2012.01)
*H04W 4/23* (2018.01)
*H04W 4/02* (2018.01)

(52) U.S. Cl.
CPC ..... *G06Q 30/0639* (2013.01); *G06Q 10/0836* (2013.01); *H04W 4/023* (2013.01); *H04W 4/23* (2018.02)

(58) Field of Classification Search
None
See application file for complete search history.

(56) References Cited

U.S. PATENT DOCUMENTS

| 5,976,038 | A | 11/1999 | Orenstein et al. |
| 6,439,345 | B1 | 3/2002 | Recktenwald et al. |
| 8,326,260 | B1 | 12/2012 | Bradish et al. |
| 8,989,094 | B2 | 3/2015 | Bradish et al. |
| 9,135,615 | B1 | 9/2015 | Mutha |
| 9,251,528 | B1 | 2/2016 | McGhie et al. |
| 9,373,091 | B1 * | 6/2016 | Belser ............. G06Q 20/00 |
| 9,408,060 | B2 | 8/2016 | Helms et al. |
| 9,645,222 | B2 | 5/2017 | Carey et al. |
| 10,484,831 | B1 | 11/2019 | Helms et al. |

(Continued)

FOREIGN PATENT DOCUMENTS

| CN | 106352884 A | 1/2017 |
| EP | 1143260 A2 | 10/2001 |
| WO | WO2015042065 A1 | 3/2015 |

OTHER PUBLICATIONS

Amancio Gonzalez, notice of allowance U.S. Appl. No. 16/232,849, filed Dec. 26, 2018 (Year: 2018).*

(Continued)

*Primary Examiner* — Michelle T Kringen
(74) *Attorney, Agent, or Firm* — Lee & Hayes, P.C.

(57) ABSTRACT

The disclosure relates to technology for determining locations of approaching recipients of online pre-requested or pre-ordered goods/services. Physical waiting queues and/or wait-lists are managed so that the goods/services will be provided without excessive wait times or unacceptably long wait lines or inferior quality in the provided goods/services. Resolution of location determination becomes finer and finer in one embodiment as the recipients get closer to the provisioning spot. If there is a change of plans, the recipients are notified ahead of time so as to avoid last minute surprises or disappointments.

23 Claims, 11 Drawing Sheets

(56) References Cited

U.S. PATENT DOCUMENTS

| | | | |
|---|---|---|---|
| 2001/0020916 A1 | 9/2001 | Kurihara et al. | |
| 2002/0082897 A1 | 6/2002 | Menelly et al. | |
| 2005/0049940 A1 | 3/2005 | Tengler et al. | |
| 2005/0197158 A1 | 9/2005 | Silverbrook et al. | |
| 2005/0204061 A1 | 9/2005 | Farchmin et al. | |
| 2006/0061476 A1 | 3/2006 | Patil et al. | |
| 2007/0042716 A1 | 2/2007 | Goodall et al. | |
| 2007/0138268 A1 | 6/2007 | Tuchman | |
| 2009/0192898 A1 | 7/2009 | Baril | |
| 2009/0307143 A1* | 12/2009 | Reistad | G06Q 30/0603 705/80 |
| 2011/0040655 A1 | 2/2011 | Hendrickson | |
| 2013/0080218 A1 | 3/2013 | Wildern, Iv et al. | |
| 2013/0260782 A1 | 10/2013 | Un et al. | |
| 2013/0290096 A1 | 10/2013 | Lizotte, III | |
| 2014/0046802 A1 | 2/2014 | Hosein et al. | |
| 2014/0122040 A1* | 5/2014 | Marti | G06F 30/20 703/6 |
| 2014/0247279 A1* | 9/2014 | Nicholas | G06T 19/006 345/633 |
| 2014/0274136 A1 | 9/2014 | Edge et al. | |
| 2014/0370917 A1 | 12/2014 | Buchheim et al. | |
| 2015/0149307 A1 | 5/2015 | Thukral | |
| 2015/0186941 A1 | 7/2015 | Anthony et al. | |
| 2015/0215762 A1 | 7/2015 | Edge | |
| 2015/0332243 A1 | 11/2015 | Kamvysselis | |
| 2016/0192130 A1* | 6/2016 | Kahn | H04W 4/021 455/456.3 |
| 2016/0335484 A1 | 11/2016 | Xie et al. | |
| 2016/0337796 A1 | 11/2016 | Pandharipande et al. | |
| 2017/0055112 A1 | 2/2017 | Westphal et al. | |
| 2017/0075518 A1 | 3/2017 | Ramakrishna et al. | |
| 2017/0083893 A1 | 3/2017 | Beyer et al. | |
| 2017/0156042 A1* | 6/2017 | Kwan | H04W 76/14 |
| 2017/0228732 A1* | 8/2017 | Badenhorst | G06Q 20/3278 |
| 2017/0234978 A1 | 8/2017 | Shvodian et al. | |
| 2017/0265046 A1 | 9/2017 | Chen et al. | |
| 2018/0048996 A1 | 2/2018 | Ciecko | |
| 2018/0075518 A1 | 3/2018 | Werbitt | |
| 2018/0096122 A1 | 4/2018 | Turner et al. | |
| 2018/0189901 A1 | 7/2018 | Poisner et al. | |
| 2019/0080384 A1* | 3/2019 | Radcliffe | G06Q 30/0621 |
| 2019/0297454 A1 | 9/2019 | Smith et al. | |
| 2019/0361463 A1* | 11/2019 | Nelson | G05D 1/0276 |
| 2021/0190928 A1 | 6/2021 | Helms et al. | |
| 2021/0241257 A1 | 8/2021 | Judkins et al. | |

OTHER PUBLICATIONS

W. Rob, M. Griesser and A. Gereke, "A realization of an emergency call system on an healthcare Real-time Location application platform," 2010 International Conference on Indoor Positioning and Indoor Navigation, 2010, pp. 1-5, doi: 10.1109/IPIN.2010.5647287 (Year: 2010).*

Office Action for U.S. Appl. No. 16/681,559,dated Aug. 9, 2021, Helms, "Wireless Locator System", 56 Pages.

Anne D'Innocenzio, "Why Scan-and-Go Technology is Surging in More Grocery Stores", Feb. 23, 2018, https://www.inc.com/associated-press/supermarket-chain-stores-new-technology-scan-go-customers-amazon-phone-app.html, 4 pgs.

Electronicsnotes, "Yagi Antenna/Yagi-Uda Aerial", retrieved on Feb. 5, 2020, https://www.electronics-notes.com/articles/antennas-propagation/yagi-uda-antenna-aerial/basics-overview.php, 7 pgs.

Office Action filed Dec. 10, 2020 in European Patent Application No. 18706899.4, 8pgs.

European Office Action dated Jun. 24, 2021 for European Patent Application No. 18706899.4, a foreign counterpart to U.S. Pat. No. 10,531,229, 9 pages.

Grocery Retail Online, "ShopperKit Adds FlyBuy Pickup to Create Seamless Curbside Experience", Aug. 12, 2019, https://www.groceryretailonline.com/doc/shopperkit-adds-flybuy-pickup-to-create-seamless-curbside-experience-001, 3 pgs.

International Preliminary Report and Written Opinion dated Aug. 6, 2019, in PCT Application No. PCT/US2018/016336, 10 pgs.

Office Action for U.S. Appl. No. 16/783,087, dated Jun. 21, 2021, Judkins, "Associating Prior Arrangements with On-Premise Manual Transactions and Concomitant Presence of Actor's Presence-Advertising Emitter in Fine Resolution Region ", 24 Pages.

Final Rejection dated Nov. 7, 2018 in U.S. Appl. No. 15/884,132, 22 pgs.

Non-Final Rejection dated Mar. 26, 2019 in U.S. Appl. No. 15/884,132, 20 pgs.

Non-Final Rejection dated Apr. 13, 2018 in U.S. Appl. No. 15/884,132, 15 pgs.

Nancy Parade, "How to Use the Airport's Self-Service Check-In Kiosks", Nov. 26, 2019, https://www.tripsawy.com/airports-self-service-checkin-kiosks-2973028, 6 pgs.

PCT Search Report and Written Opinion dated Mar. 31, 2021 for PCT Application No. PCT/US2020/066769, 18 pages.

Skip, "Checkout on Your Phone", 2018, retrieved on Feb. 5, 2020, https://getskip.com/, 8 pgs.

Wikipedia, "Antenna (radio)", retrieved on Feb. 5, 2020, https://en.wikipedia.org/wiki/Antenna_(radio)#Characteristics, 21 pgs.

Xirio Online, "Radio Reciever/Terminal Parameters", retrieved on Feb. 5, 2020, https://www.xirio-online.com/help/en/rx_radio_params.html, 2 pgs.

European Office Action dated Apr. 11, 2022 for European Patent Application No. 18706899.4, a foreign counterpart to U.S. Pat. No. 10,531,229, 7 pages.

Office Action for U.S. Appl. No. 16/681,559, dated Nov. 18, 2021, Helms, "Wireless Locator System", 57 Pages.

Office Action for U.S. Appl. No. 16/783,087, dated Mar. 10, 2022, Judkins, "Associating Prior Arrangements with On-Premise Manual Transactions and Concomitant Presence of Actor's Presence-Advertising Emitter in Fine Resolution Region", 23 Pages.

Office Action for U.S. Appl. No. 16/681,559, dated Mar. 9, 2022, Helms, "Wireless Locator System", 53 pages.

Office Action for U.S. Appl. No. 16/725,262, dated Jun. 13, 2022, Helms, "High Confidence Isolated Presence Detection in Fine Resolution Region", 13 pages.

* cited by examiner

500

Committed-to Customer Waitlist

| List Position | TID | Location | Velocity | Distance | Priority | Appoint Time | Order Completion |
|---|---|---|---|---|---|---|---|
| 01 | E07x34 | 262e | 25 MPH | D1 | P1 | 00:00:45 | 99% |
| 02 | E07y35 | 262d | 0 MPH | D2 | P2 | 00:03:01 | 75% |
| 03 | E07z36 | 262c | 40 MPH | D3 | P3 | 00:06:05 | 25% |
| 04 | E07a41 | 262b | 25 MPH | D4 | P2 | 00:10:10 | 5% |
| 05 | E07b42 | 262a | 0 MPH | D5 | P4 | 00:18:30 | 1% |
| 06 | E07c43 | 263a | 0 MPH | D5 | P4 | 00:20:59 | 0% |
| 07 | E07d44 | 264a | 25 MPH | D6 | P1 | 00:25:15 | 0% |
| ••• | ••• | ••• | ••• | ••• | ••• | ••• | ••• | hh:mm:ss Count Down Format

505

Requesting to Join Waitlist

| List Position | TID | Location | Velocity | Distance | Priority | Appoint Time | Order Completion |
|---|---|---|---|---|---|---|---|
| 01 | E07e45 | 265a | -25 MPH | D1 | P1 | --:--:-- | 0% |
| 02 | E07f46 | 266b | 0 MPH | D2 | P2 | --:--:-- | 0% |
| 03 | E07g47 | 263c | 40 MPH | D3 | P3 | --:--:-- | 0% |
| 04 | E07h48 | 263d | 25 MPH | D4 | P2 | --:--:-- | 0% |
| 05 | E07i49 | 264a | 0 MPH | D5 | P4 | --:--:-- | 0% |
| 06 | E07k50 | 265a | 0 MPH | D5 | P4 | --:--:-- | 0% |
| 07 | E07m52 | 266a | 25 MPH | D6 | P1 | --:--:-- | 0% |
| ••• | ••• | ••• | ••• | ••• | ••• | ••• | ••• |

Committed-to Order Waitlist

| List Position | TID | Location | Priority | Appoint Time | Order Completion | Prep/Prod Details |
|---|---|---|---|---|---|---|
| 01 | E07x34 | Prod Station 5 | P1 | 00:00:45 | 99% | ••• |
| 02 | E07y35 | Prod Station 4 | P2 | 00:03:01 | 75% | ••• |
| 03 | E07z36 | Prod Station 3 | P3 | 00:06:05 | 25% | ••• |
| 04 | E07a41 | Prep Station 2 | P2 | 00:10:10 | 5% | ••• |
| 05 | E07b42 | Prep Station 1 | P4 | 00:18:30 | 1% | ••• |
| 06 | E07c43 | Pre-Prep | P4 | 00:20:59 | 0% | ••• |
| 07 | E07d44 | Pre-Prep | P1 | 00:25:15 | 0% | ••• |
| ••• | ••• | ••• | ••• | ••• | ••• | |

509

Committed-to Delivery Spot Waitlist

| List Position | TID | Location | Priority | Appoint Time | Full | Prep/Prod Details |
|---|---|---|---|---|---|---|
| 01 | E07x34 | Drive-thru #1 | P1 | 00:00:45 | 65% | ••• |
| 02 | E07y35 | Drive-thru #2 | P2 | 00:03:01 | 75% | ••• |
| 03 | E07z36 | Drive-thru #1 | P3 | 00:06:05 | 65% | ••• |
| 04 | E07a41 | Resrvd-Park #3 | P2 | 00:10:10 | 0% | ••• |
| 05 | E07b42 | Interior Seats | P4 | 00:18:30 | 50% | ••• |
| 06 | E07c43 | Counter Pickup | P4 | 00:20:59 | 80% | ••• |
| 07 | E07d44 | Interior Seats | P1 | 00:25:15 | 50% | ••• |
| ••• | ••• | ••• | ••• | ••• | ••• | |

FIG. 5B

LOCATION SENSITIVE QUEUES MANAGEMENT

BACKGROUND

There is a growing demand for customer-centric online order and appointment/reservation processing. Providers who are asked to provide requested goods and/or services in timely and high quality manner to online requestors or to commit to appointments or reservations for the same often have to cope with surges and ebbs in volume of arriving orders/appointments and variations in resources at hand for satisfying customer/patron requests as well as coping with fluctuating flows of patron traffic in and out of their establishments. Customer relations may suffer if a patron is made to wait for unexpected long times or asked to accept inferior servicing.

By way of a nonlimiting example, a fast food restaurant may feature a drive through window for which customers can pre-order items online, optionally pre-pay online and then drive in along a designated quick-pickup traffic lane to pick up their respective pre-ordered and optionally pre-paid items at a scheduled time or in a scheduled time span. However, if too many orders come in at once, the kitchen may not be able to handle the surge in production demand. If too many vehicles try to drive up at the same time onto the drive-through lane, the limited length of the lane may not be able to accommodate the incoming traffic surge. If there is substantial time delay between early completion of food preparation and late pick up time at the drive through window, the ordered food items may decay in quality and thus be no longer hot and fresh or otherwise in acceptable condition for consumption. If there is a backup in production and customers have to circle the block or have to park around the back and wait, the whole purpose of convenient pre-ordering and quick pick up is defeated. Also if the parking lot has finite space, it may overfill. Any of these problems and yet further problems can result in customer dissatisfaction, decline in goodwill and loss of business. Solutions are needed.

It is to be understood that some concepts, ideas and problem recognitions provided in this description of the Background may be novel rather than part of the prior art.

BRIEF SUMMARY

In one embodiment, there is provided a machine-implemented method that is responsive to locations of prospective recipients of online requested goods/services that are requested to be provided at planned provisioning spots, where the method comprises; (a) assigning a temporary transaction identification sequence (TID) to a prospective recipient and to requested goods/services of the prospective recipient that are requested online to be provided at a respective planned provisioning spot; (b) downloading the assigned TID into a location revealing mobile device of the prospective recipient; (c) repeatedly determining the location of the mobile device based on wireless transmissions by the mobile device, the transmissions providing the assigned TID; (d) based on the repeatedly determined location, determining a separation (e.g., in time and/or distance) between the prospective recipient and the planned provisioning spot; (e) in response to the determined separation of the prospective recipient from the planned provisioning spot, determining whether to commit to providing the requested goods/services; and (f) in response to determining to commit, informing the prospective recipient of the commitment.

In one embodiment, the method uses the repeatedly determined location to not only determine whether to commit but also when to commit.

In one embodiment, there is provided a computer system comprising one or more processors and a memory having collectively stored therein instructions that, when executed by the one or more processors, cause the one or more processors to: (a) assign a temporary transaction identification sequence (TID) to a prospective recipient and to requested goods/services of the prospective recipient that are requested online to be provided at a respective planned provisioning spot; (b) download the assigned TID into a location revealing mobile device of the prospective recipient; (c) repeatedly determine the location of the mobile device based on wireless transmissions by the mobile device, the transmissions providing the assigned TID; (d) based on the repeatedly determined location, determine how far away the prospective recipient is from the planned provisioning spot in terms of at least one of radial distance, effective distance and chronological distance; (e) in response to at least one of the determined distance-wise and/or timewise separations of the prospective recipient from the planned provisioning spot, determine whether to commit to providing the requested goods/services; and (f) in response to determining to commit, inform the prospective recipient of the commitment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 5A illustrates a first waitlist for transactions that the provider has committed to and a second list of proposed transactions that the provider has not yet committed to.

FIG. 5B illustrates a third waitlist for tracking progress of orders in preparation and production states and a fourth list for tracking capacity at planned provisioning spots for respective ones of committed-to goods and/or services.

DETAILED DESCRIPTION

Figure 1:
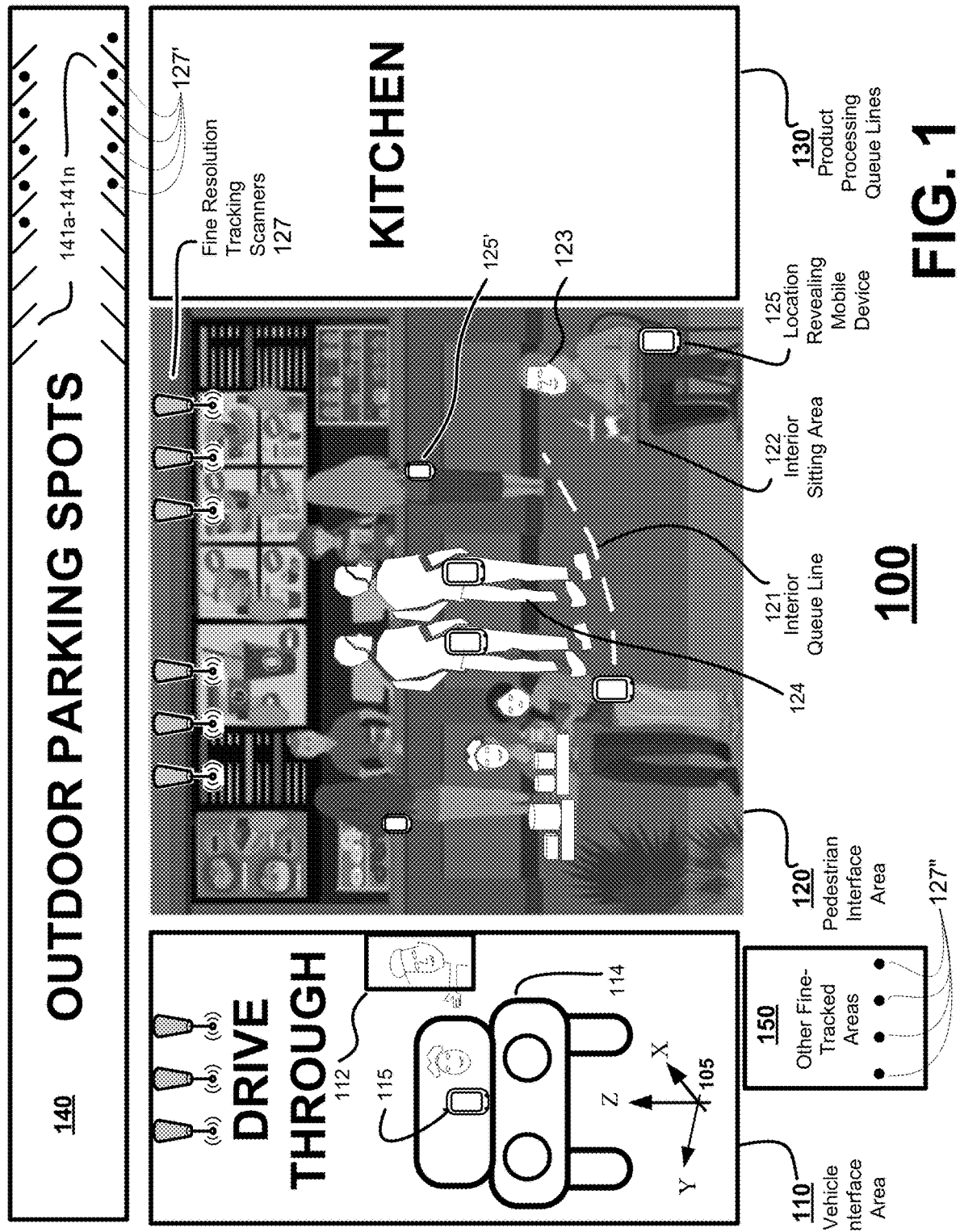
FIG. 1 is a schematic diagram of an environment in which a provider of goods and/or services might wish to control the expectations of patrons who plan to wait or are waiting on various queue lines or are gathering in other forms of waiting areas or on wait lists, where the provider might wish to coordinate provisioning of goods/services accordingly based on expected wait times for such patrons.

The disclosure relates to technology using resources of wireless networks and personal mobile communicators to track progress of expecting recipients of goods and/or services and to make predictions about arrival times (and optionally to control arrival times) as the recipients make their way to a goods/services provisioning spot and as corresponding goods/services (or service providers) also advance to the goods/services provisioning spot for timely intersection with recipients at respectively scheduled appointment or reservation times or time windows. In one embodiment, a mobile wireless device normally or routinely carried by the recipient (e.g., the recipient's smartphone, smart watch or other such routinely carried or worn mobile device) is used to keep track of the location of the recipient. More specifically, the disclosure relates to a technology using wireless transmitters, wireless receivers and correlating databases to determine locations of, advancement speeds of, and/or distances away (chronologically and/or spatially) of expected recipients from goods/services provisioning spots in both coarse and finer resolutions as the recipients make their way to such goods/services provisioning spots in accordance with pre-planned or implied provisioning time windows. The disclosure also relates to determining progress of corresponding goods/services (or service providers) that are to also advance to the goods/services provisioning spot for delivery at respective appointment/reservation times or in corresponding time windows. The disclosure relates to management of queuing resources (whether physical and/or in the form of wait-lists) for accommodating traffic flows of expected recipients of goods/-services as the recipients make their way to and through respective goods/services provisioning spots (e.g., drive-through windows, pick-up areas, counter lines and waited-on seating areas) and as the requested goods and/or services and/or service providers also advance towards the scheduled provisioning spots for timely intersection with arrival of their respective recipients.

For sake of brevity, "goods/services" will be used herein to refer to the provisioning of any one or more of goods, services and service providers as appropriate for a given context. More specifically and as an example, when a customer makes an appointment with a specific cosmetologist at a beauty salon, the appointment making typically includes an assumption that a chair and/or other service station will be available, that the required hair coloring or other cosmetological products will be available and that the service providing cosmetologist will also be there and ready to provide the requested goods and/or services starting at the appointed time or in a promised or implied time window. Confirmation of the appointment by both of the involved parties generally constitutes a commitment and a sealing of the deal for the timely provision of the goods/services at a specified location.

While one example given here relates to the fast food pre-ordering industry and another to making an appointment with a cosmetologist, the present teachings are not to be limited to just these few examples. There are many aspects of day to day living where appointment-makers, order-placers and/or prospective recipients of goods/services expect to have the goods/services timely provided at a scheduled time or in a scheduled or implied time span based on online ordering or online reservation/appointment making even if it involves some acceptable amount of variable delay and waiting. The respective recipients/appointment-makers may experience dissatisfaction and disappointment if: (a) their expectations are not well managed, (b) if queues for different kinds of patrons (e.g., drive-through ones, sit down waited-upon ones) are not well managed and wait times are substantially longer than planned for, (c) if goods/services provisioning resources are not well managed to coincide with expectations and arrival times of recipients and (d) if the requested goods/services are not provided in timely, high quality manner or not at all. Further examples where similar kinds of issues typically arise include slow-food restaurants where customers make online reservations, drive long distances only to show up and then find that there are no tables to accommodate them and/or not enough waiters to accommodate them, no seats in the waiting area, no spaces in the parking lot, not enough kitchen bandwidth and so forth. Yet other examples include medical or alike service providing venues where patients make online appointments, show up and then find that there are no seats in the waiting area, no spaces in the parking lot, the health providers are backed up and require longer than expected wait times (or have been called away due to an emergency) or other such problems. Entertainment providing venues may have similar problems where customers pre-order tickets online, show up at the theater and find long waiting lines at the ticket office or backed up parking lots or a host of other problems related to mismatches between customer arrival times, customer expectations and the then available services. Yet further examples include item-pick up areas where patrons have made appointments to pick up online pre-ordered goods, timely show up at the agreed to pick up area and then have to wait for unreasonably long wait times while the goods are searched-for and found or not found at all. It is desirable to accurately predict when specific patrons will show up at a provisioning spot for requested goods/services and/or to control when and where such patrons arrive so that expected or implied wait times are not exceeded and the expected goods/services are provided in timely quality manner.

In accordance with the present disclosure, locations and/or rates of approach of recipients to respective goods/services provisioning spots are automatically and repeatedly monitored while rates of progress toward delivering corresponding requested goods/service to the promised provisioning spots and at the promised times or in the promised/implied time windows are monitored and coordinated to intersect with predicted and/or controlled times of arrival of the recipients. In cases where the desired intersection cannot be assured, the expectations of the recipients are managed ahead of time, prior to arrival, to thereby avoid last minute surprises, disappointments and unacceptably long wait times.

The locating of users of personal mobile devices is known for relatively coarse levels of resolution. For example, cellular towers may be used to determine presence of cellular smartphones within respective telephone communication cells or as the users cross from one cell to the next (and invoke cellular handovers) or by means of proximity triangulation. In another example, the users' mobile devices use GPS satellite technology to determine respective locations to a resolution of a few meters (e.g., 10's of meters) and to then broadcast this location information. However, for finer levels of resolution based on short range broadcasts, supporting technologies are limited. Also, if the identity of the user is broadcast together with the location information, privacy may be compromised.

In an embodiment in accordance with the present disclosure, a user's personal mobile device is pre-configured to contain a background peripheral service (BPS) that transmits a temporary transaction identification sequence (TID) when the service is temporarily connected to. The user's actual identity is not broadcast. One or more locally disposed scanners at a vendor's venue attempt the connection when the user arrives at an area controlled by the venue and then the scanners detect the invoked BPS transmission of the TID. Based on signal strength received by the scanner(s) within the given venue, a likely one or more pinpointing locations of the user is/are automatically determined to a desired level of resolution (e.g., about 1 meter or less). The user's identification and associated request for goods and/or services are determined from the transmitted TID. Upon successful delivery, in one embodiment, the BPS and its TID are deleted to thereby assure privacy.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the present teachings. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

FIG. 1 illustrates an environment (e.g., a fast food retail venue) 100 which can support a number of different online pre-ordering schemes in accordance with the present disclosure. The schematic illustration depicts the venue 100 as having venue-controlled or venue-monitorable areas such as a vehicle drive-through interface area 110, a pedestrian interface area 120, a product processing area 130, a vehicle parking area 140 and other customer-traversed areas 150 (e.g., a storefront sidewalk area, a building lobby, an elevator waiting area, an elevator car, a staircase, an escalator, a hallway leading to the venue and so on).

These are merely nonlimiting examples of goods/services providing spots that may be found in a patrons-servicing establishment. More specifically, the illustrated establishment 100 may include an interior sitting area 122 (e.g., a waiting area with tables and/or chairs) where patrons 123 who have pre-ordered online using worn (or carried) location-revealing mobile devices 125 may wait for the requested items to be delivered to them by a service provider (e.g., waiter) or to be notified that the requested items are available at a pick-up window. The establishment may include interior queue lines 121 where other patrons 124 who have pre-ordered online (and who optionally carry or wear location-revealing mobile devices 125') can line up for more immediate service at a service counter where; when they reach the counter, they expect to immediately receive their preordered items (e.g., fresh hot food items, cold drinks). The establishment may include one or more drive-through servicing windows 112 (optionally of different kinds) to which driving-through vehicles 114 approach in order to immediately receive delivery of their online pre-ordered (and optionally pre-paid for) items. The driving-through vehicles 114 and/or their drivers may possess location-revealing mobile devices such as smart phones 115, smart watches and so on used for placing the orders (optionally pre-paying for the goods/services) and for tracking the locations of the location-revealing mobile devices.

In one embodiment, the establishment 100 includes or has access to fine resolution location determining scanners (e.g., Bluetooth™ scanners, Fifth generation (5G) WiFi scanners) 127 which cooperatively interact with software installed in the location-revealing mobile devices 125, 125', 115 of the various patrons 123, 124, 114 for determining their respective locations in areas (e.g., 110, 120, 140, 150) for which the establishment has tracking rights or permissions where the tracking can be carried out to respective levels of course and finer resolutions (e.g., the finer being to within about a meter or less). Although not shown in FIG. 1, it is to be understood that the fine resolution location determining scanners 127 are operatively coupled (e.g., wirelessly) to a computer network for relaying location determinations made by them for processing by one or more data processors available on the network. The scanners 127 can keep track to appropriate levels of resolution (e.g., to within 2 feet) of where pedestrians are in the pedestrian interface area 120 and where vehicles are in vehicle accommodating areas such as drive-through lane 110 and parking area 140. Although shown in FIG. 1 only by means of schematic dots, it is also to be understood that the fine resolution location determining scanners 127', 127" or equivalents are also provided in the parking area 140 and in other patron-traversed areas (e.g., surrounding sidewalks). It is to be understood that Although Bluetooth™ and 5G directed beam WiFi transceivers are mentioned as examples of fine resolution location determining scanners, the present disclosure is not limited to just these examples. Rather, numerous alternative wireless devices can be used for providing fine resolution location determination (e.g., to a resolution of one meter or less, preferably 2 feet or less) including optical (e.g., IR) and magnetic detectors.

The interior of the goods/services provisioning area 130 (e.g., kitchen) is not shown but may be understood to include various preparation and production stations including those for storing utensils, for assembling utensils (e.g., pots, pans) to be used for a specific order, for collecting raw or finished materials, for processing them (e.g., cooking meats, carbonating, mixing and/or cooling drinks, toasting bread slices, etc.) and packaging them (e.g., on trays or into bags) so that they can be conveniently provided to respective ones of the recipients (e.g., 123, 124, 114) at the appointed times and places. The interior of the goods/services production area 130 may alternatively or additionally include service providers (e.g., cooks, waiters, dishwashers, table bussers) who are charged with performing various work assignments. These production workers may also need to be available and in ready condition so that timely and high quality provisioning of requested goods/services can occur. In general, it takes time for preparation and production activities in the goods/services provisioning area 130 (or out on the floor) to complete and this preparation and/or production time should be accounted for when confirming (committing to) orders or other online requests made by patrons of the establishment and when assuring that the promised goods/services are delivered as promised.

In one embodiment, the parking area 140 may include parking spaces 141a-141n (n being an indicator of number of parking spots) that can be reserved online. Various kinds of sensors including Bluetooth™ ones and/or magnetic proximity ones (127') may be used to sense whether or not a vehicle is positioned in respective ones of the reserveable or public spots 141a-141n and who is sitting in (or on) the vehicle (e.g., automobile, motorcycle, bus). The present teachings contemplate a patron (e.g., 123, 124) of an establishment (e.g., 100) making on online reservation for a reserveable parking spot (e.g., 141a-141n, optionally spots of different sizes), getting confirmation that the requested spot is reserved in a particular first time window for the patron and also pre-ordering goods/services and getting confirmation that the requested goods/services will be provided to the patron in the same first time window or in a second time window that starts after the start of the first time window. Thus the patron can receive assurances that both a parking spot and the requested goods/services will be timely provided.

Although FIG. 1 implies that customer populations and traffic flows in the exemplary establishment 100 are being well managed such that interior queue lines (e.g., 121) are neither too long or too short, such that exterior queue lines (e.g., drive-through lane 110) are neither too long or too short, such that goods/services preparation and production area (e.g., kitchen 130) is neither overwhelmed with too many orders nor underwhelmed with too few, and such that food items are provided in prime condition (e.g., hot and fresh) such outcomes do not come about inherently. If the establishment 100 accepts (commits to) too many online orders at once, the waiting areas may quickly fill with crowded together and upset customers. If the establishment 100 accepts (commits to) online orders made by prospective recipients who are far away (distance-wise or timewise) but prepares the food items too soon, the items will be cold and stale by the time the recipients arrive. If the establishment 100 accepts (commits to) online orders made by prospective recipients who are very close (distance-wise or timewise) and then tries to rush the food preparation to coincide with too-early arrival times by those nearby recipients when the kitchen is trying to fulfill the orders of customers who are already waiting, food quality may suffer and customer good will may be lost. On the other hand, if commitments to provide are made based on automatically repeated monitoring of recipient locations and based on automatically repeated monitoring of capabilities to prepare and produce requested goods/services in timely and high quality fashion, many of these problems can be avoided or at least minimized. It is to be understood by the way that the establishment 100 (e.g., fast food venue) is not limited to fulfilling only online made requests for goods/services. Commitments (verbal or otherwise) may be made to other kinds of patrons including walk-ins. Some of the technology disclosed herein may be used to detect the presence of patrons other than those who make online requests for goods/services. The capacity of various physical wait areas and virtual wait-lists to timely accommodate online requests for goods/services may take into account detection of the other kinds of patrons and/or may take into account statistically-based predictions (e.g., made by an expert knowledge base) about how many of the other kinds of patrons are to be expected and when. In one embodiment, if the specific establishment (e.g., 100) decides not to commit to the online request for the goods/services, its software (e.g., downloaded mobile app 317) may automatically suggest alternate establishments to whom the request can be redirected, for example another branch of the same brand.

Figure 2:
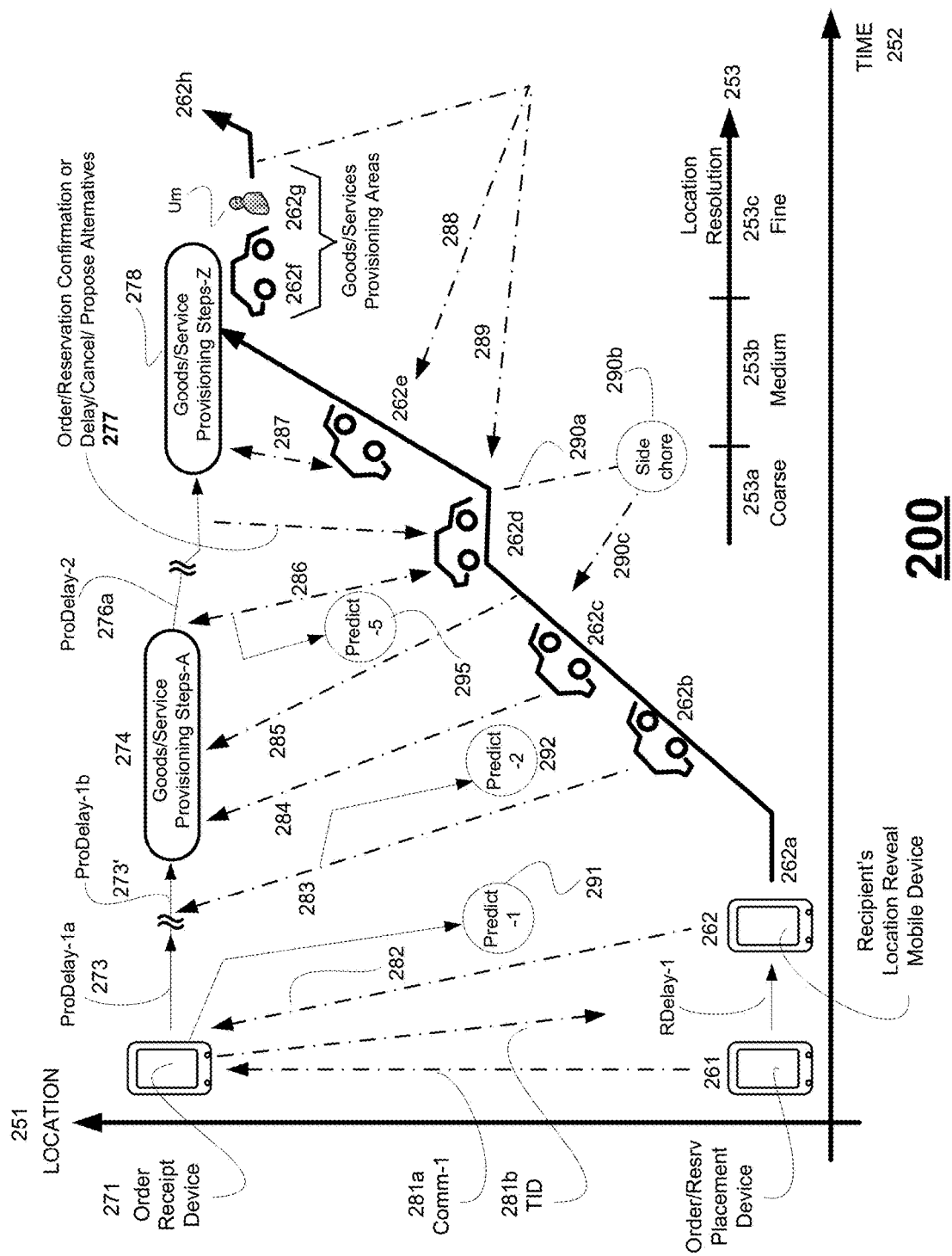
FIG. 2 is a multi-axes graph used for explaining how location aware management of assigning patrons for queuing up onto various queues (and/or wait lists) can help alleviate problems encountered with pre-ordering of goods and/or services or making appointments or reservations for provisioning of goods/services.

FIG. 2 is a combination multi-axis graph and schematic 200 that is useful in explaining aspects of the present disclosure with respect to monitoring locations and approach speeds of prospective recipients who have made or are making online requests for goods/services. The graph/schematic 200 is referred to for explaining how decisions may be made with respect to deciding whether to commit and/or when to commit to a provisioning of online requested goods/services. The graph/schematic 200 is referred to for explaining how decisions may be made with respect to deciding when to begin and continue with preparations and/or production of the requested goods/services so that completion substantially coincides with predicted arrival times of respective recipients so that the recipients do not have to wait around (e.g., mill around) too long and so that the goods/services are provided in prime or near prime quality. First axis 201 represents locations within a 2D or 3D frame (e.g., corresponding to frame 105 of FIG. 1). Second axis 202 represents chronological points along a timeline. Third axis 203 represents levels of location resolution that may be utilized based on at least one of determined location and current time. The third axis 203 is drawn parallel to the second axis 202 to indicate that in one embodiment, resolution of location determination becomes finer and finer as the recipient gets closer to a pre-specified provisioning spot (e.g., 262f and/or 262g).

Icon 261 is placed in the bottom left corner of the graph 200 to represent a first computer device used at an initial time and at an initial location to place an order and/or to make a reservation (or to make or request an appointment) with respect to a pre-identified establishment (e.g., 100 of FIG. 1). The first computer device 261 may also identify itself, the order-placer and/or an alternate recipient who will receive the goods/services. Icon 271, which is placed at the top left of the graph 200 represents a second computer device that receives the placed request for making an order/reservation. Dash-dot line 281a represents a first communication from the location of the order-placing first device 261 to the location of the order/reservation request receiving second device 271. Information included in the first communication 281a may include details about: (1) the requested goods/services; (2) the requested time and/or place where the goods/services are requested to be provided; (3) an identification of the recipient (e.g., user Um) of the requested goods/services; and (4) an identification of a location-revealing mobile device 262 (e.g., a third computer device) that is to be carried or worn by the identified recipient Um while traveling to a provisioning area (e.g., 262f or 262g) where the requested goods/services are to be provided. In one embodiment, first and third devices 261 and 262 are one and the same. In an alternate embodiment, where the mobile device 262 is different, a second communication 281b is transmitted from receiver 271 to the mobile device 262 to provide details of the placed order/reservation (281a) and to further provide: (5) a unique transaction identification sequence (TID) to be used while managing the provisioning of the requested goods/services and (6) an approximate time or time window in which the identified recipient should expect to receive the requested goods/services at a specified provisioning spot.

Figure 3:
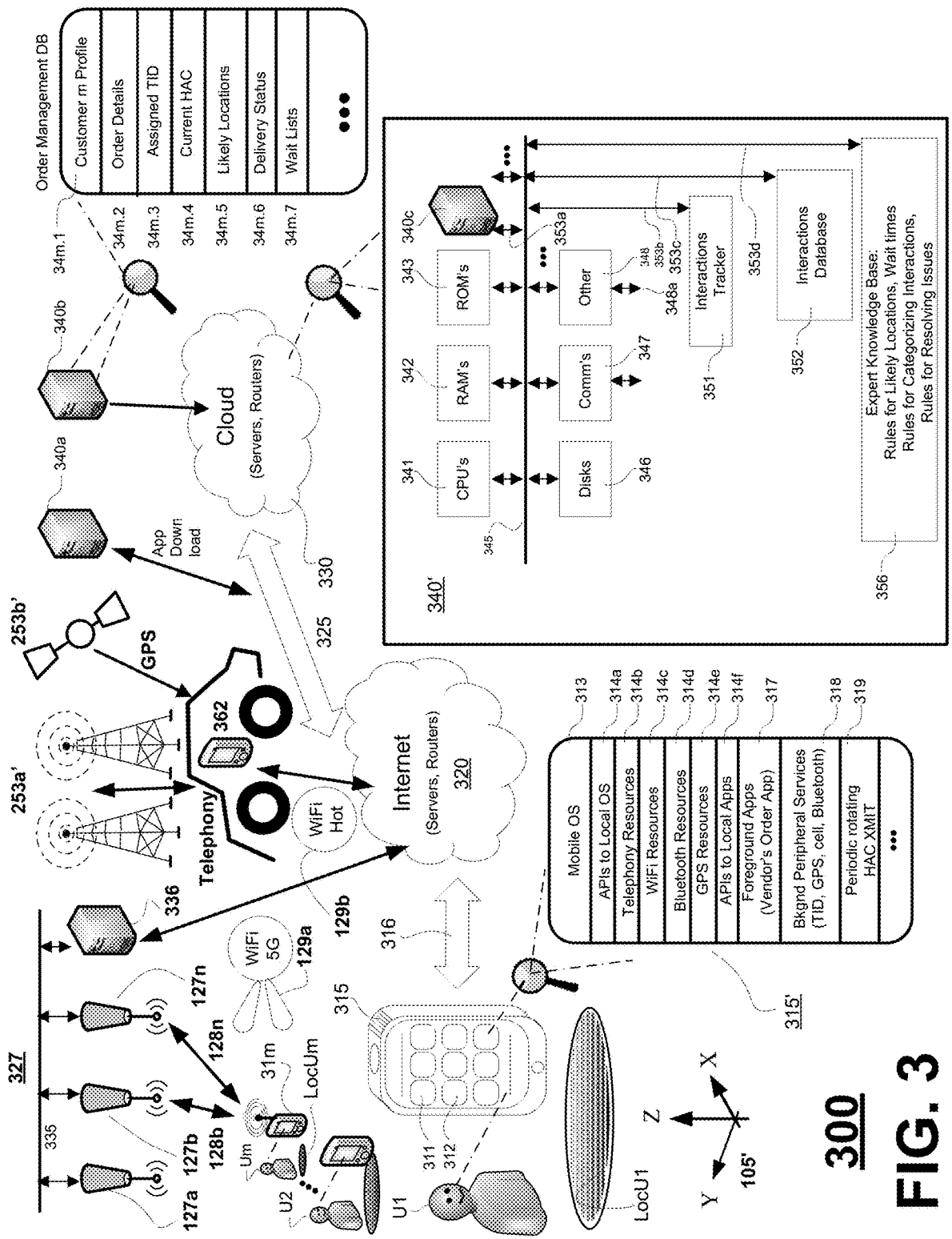
FIG. 3 illustrates a system for determining a location of a mobile user using a personal mobile device carried by the user.

The chronological spacing RDelay-1 in the graph 200 between represented devices 261 and 262 indicates a first delay between the time the request for order/reservation acceptance is placed and when a corresponding TID (281*b*) is received by recipient's device 262. Although the recipient's device 262 is shown to be located in approximately the same location 262*a* as that of the order/reservation placing device 261, the former device (262) can be located somewhere else. In response to receiving the TID (281*b*), the recipient's location-revealing device 262 allows the receiving end 271 to discover the current location 262*a* of the recipient's device 262 by way of third communication 282. The discovery of the current location 262*a* of the recipient's device 262 may be carried out in accordance with several different methods, including using cellular telephony information, using global positioning satellite (GPS) information and using information obtained by stationary WiFi routers. Referring briefly to FIG. 3, items 253*a'* represent the use of cellular telephony information to locate device 262 based on the current cell base station (e.g., tower) in whose domain device 262 is currently positioned and/or based on occurrence of handover from one base station to another as the device 262 crosses the boundary between adjacent cells. Item 253*b'* represents the receipt of GPS signals from an in-view constellation of global positioning satellites for determining the current location of device 262. Item 129*b* represents a stationary WiFi hot spot to which the mobile device 362 can temporarily connect when in range of the WiFi hot spot 129*b* (or one of its directed beams if the latter is a 5G one). The cellular telephony method (253*a'*) tends to be relatively course and typically resolves location to no better than tens or hundreds of meters. The GPS locating method (253*b'*) tends to be finer but typically cannot resolve location to a resolution of better than a few meters. Short range near field (e.g., having effectiveness over just a handful of meters) or longer range transmitters and receivers (e.g., Bluetooth™ transceivers, directed bean 5G WiFi transceivers 129*a*) may be used to resolve device location to an even finer resolution (253*c* in FIG. 2) of about one meter or less. Scanners 127 of FIG. 1 are an example of such transceivers and will be discussed in greater detail below. Preferably, communication 282 not only informs the receiving end 271 of the location of device 262 but also of its speed and yet more preferably also of its direction. When provided with information for determining the velocity of device 262, the receiving end 271 can determine if the recipient is already moving toward the initially planned provisioning area 262*f* or 262*g* or not and can make corresponding predictions about expected time of arrival (ETA). While FIG. 2 depicts the identified recipient (e.g., user Um at location 262*g*) as approaching by car, it is within the contemplation of the present disclosure that the recipient may alternatively or additionally approach the planned delivery spot (e.g., 262*f* or 262*g*) by walking, riding a bicycle, by using an elevator, an escalator or other such means and that fine resolution tracking of the identified recipient may entail tracking him/her in approach areas other than just those conventionally used by automobiles.

Still referring to FIG. 2, in response to the first location revealing communication 282, the receiving end 271 makes a coarse first prediction 291 (Predict-1) about how long it will take the identified recipient (Um) to arrive at the planned provisioning spot (262*f* or 262*g*) based on the first location indicated by, and optionally on the velocity indicated by, the first communication 282. This first prediction 291 can be based on the calculated distance between the first indicated location 262*a* and the planned provisioning spot and on average traveling times by average recipients in navigating from the first indicated location 262*a* to the planned provisioning spot (262*f* or 262*g*) as optionally augmented by a given current velocity of the recipient's device 262. In one embodiment, arrival predictions like 291 may be further based on currently or generally known traffic conditions as automatically acquired from the internet or elsewhere. The coarse first prediction 291 (Predict-1) can be used to decide if a commitment to providing the requested goods/services should be made; and if yes, relaying back to the recipient's device 262 a first proposed appointment time or time window within which to expect delivery of the requested goods and/or services. In one embodiment, the first proposed appointment time or time window is not relayed to the prospective recipient until a later time when the provider is ready to commit to such timely provisioning, for example by way of the later timed, order confirming communication 277 depicted in FIG. 2. However, in other embodiments, approximate appointment times or time windows may be committed to and communicated earlier than that based on predictions of expected conditions at the scheduled provisioning time.

Given the course first prediction 291, it may be decided at the receiving end 271 to automatically introduce a first preparation and production delay 273 (ProDelay-1a) before submitting the requested order/reservation to a first goods/services provisioning station 274 (in which initial preparation and/or provisioning steps denoted as A, B, C, are begun). Preparation may include simply creating a real or virtual ticket for the requested goods and/or services. The first production delay 273 may have several uses. First, it may be undesirable to begin the initial preparation and/or provisioning steps A, B, C, . . . too far ahead of the currently predicted time at which the recipient (Um) is expected to arrive at the planned provisioning spot (262*f* or 262*g*). More specifically and as an example, requested cooked foods may become cold and/or stale and cold drinks may become too warm or diluted by melting ice if prepared too far in advance. Second, the inserted first preparation/production delay 273 (ProDelay-1a) allows the recipient to upload a cancellation of the online-made order/reservation (281*a*) if there is a change of mind based on intervening circumstances or for no reason at all. If the cancellation is uploaded then initial preparation and/or provisioning steps A, B, C, . . . are not carried out and the establishment 100 saves on unnecessary expenditure of resources. It is to be understood that, because the recipient or the placer (261) of the order/reservation can freely cancel during the initial phase, there is not yet a firm commitment to the order/reservation by either the request placing party (261) or the receiving party/entity (271). In one embodiment, a graphical user interface (GUI) of the order-placing software (inside device 261) indicates that there is not yet a commitment at this time.

Figure 4A:
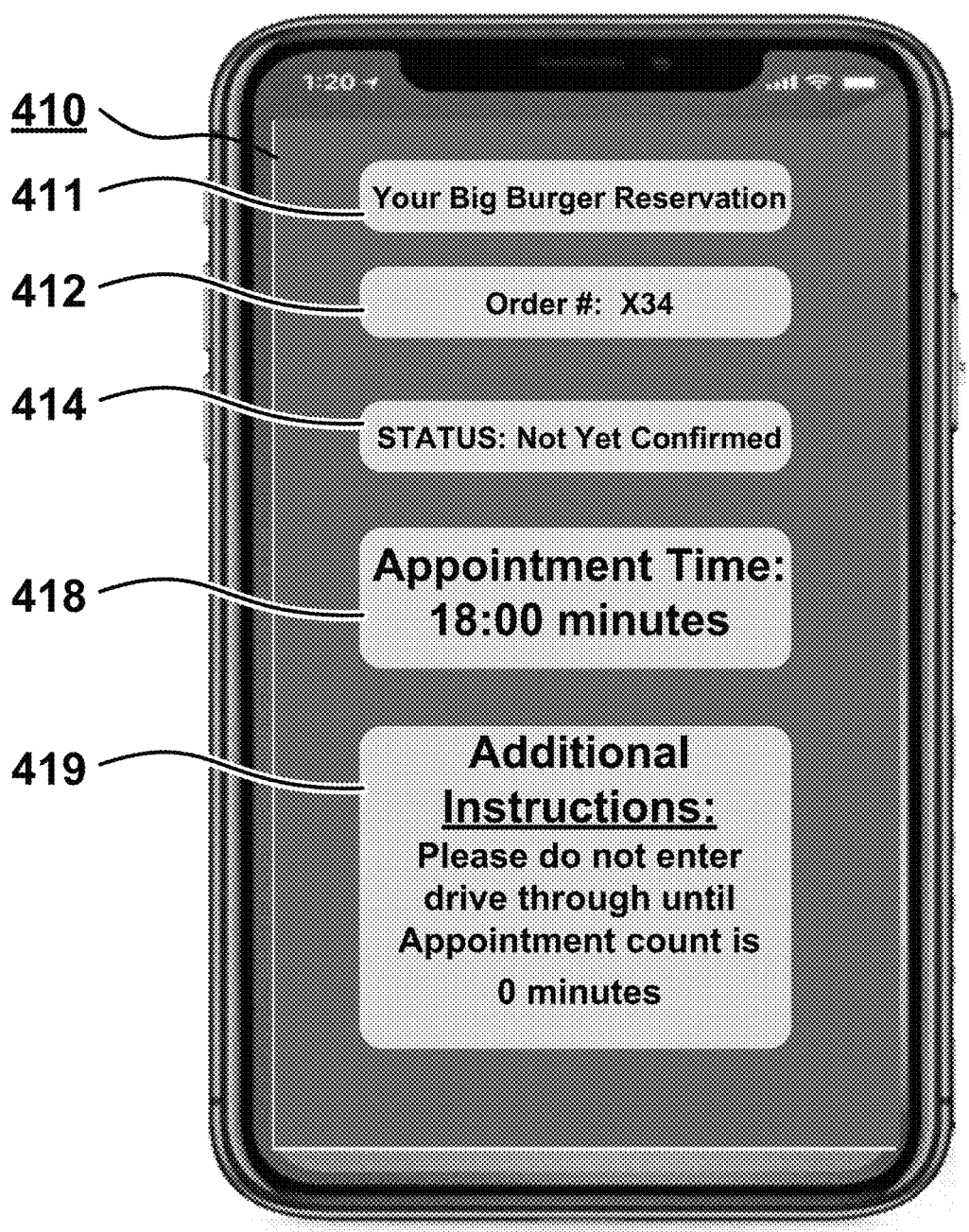
FIG. 4A depicts a first Graphical User Interface (GUI) state of a personal mobile device of a prospective recipient who is planning to receive online-ordered goods/services in accordance with the present disclosure.

FIG. 4A depicts a first state 410 of an example graphical user interface (GUI) in accordance with the present disclosure where the status 414 of a requested reservation or appointment (418) for provisioning of requested goods/services is "Not Yet Confirmed". In the given example, field 411 indicates the identity of the establishment (here a fictitious name, 'Big Burger'), field 412 indicates an associate order number (e.g., X34), field 418 indicates the amount of time left until the currently planned but provisional appointment (e.g., 18 minutes and zero seconds) and field 419 provides additional instructions to the recipient about the contemplated reservation or appointment. In the illustrated example, the recipient is instructed to not enter a drive-through lane for prepaid orders until the appointment countdown in field 418 reaches zero minutes. Other forms of instruction are contemplated and may include additional voiced instructions (e.g., provided through the recipient's device 262).

Figure 4B:
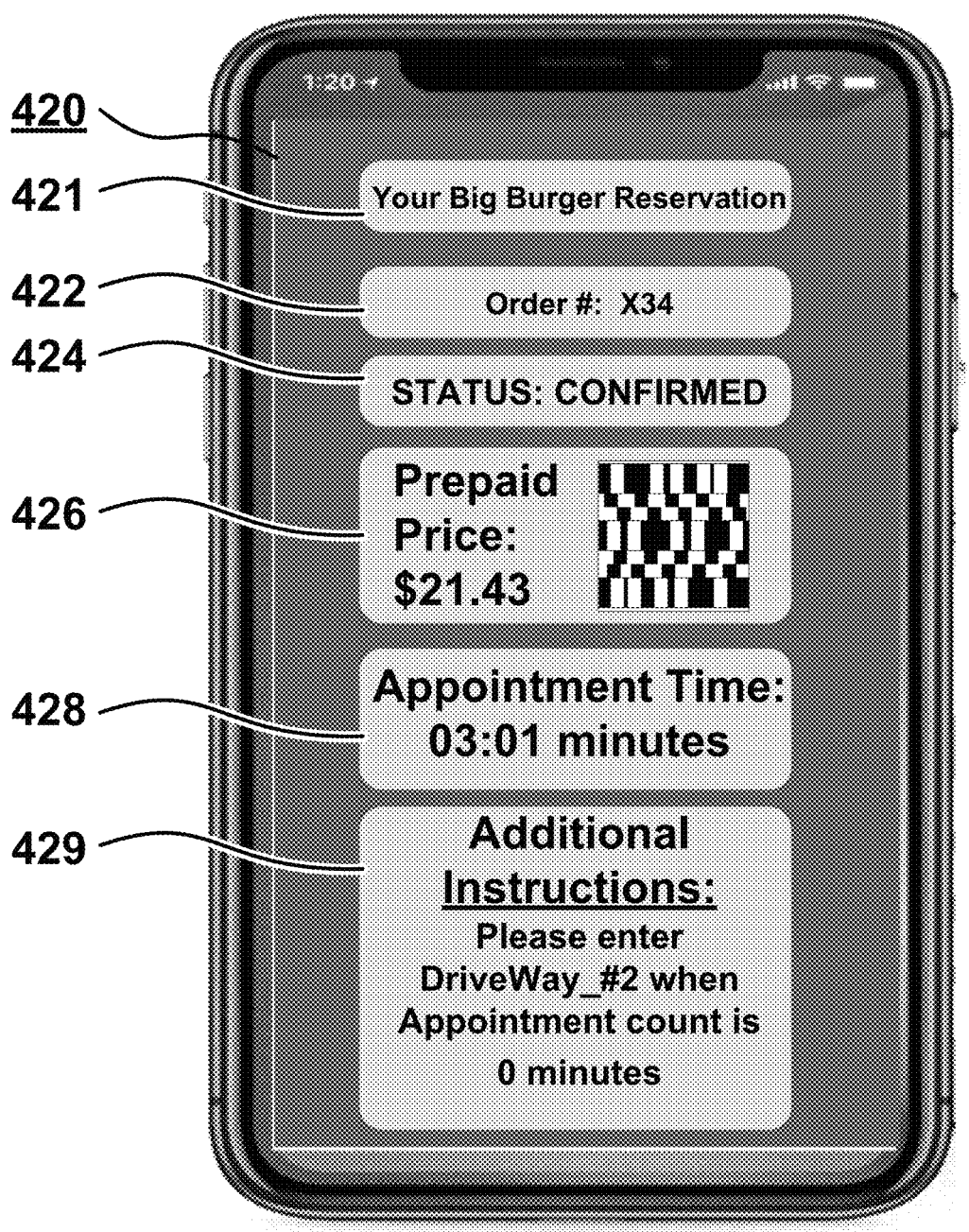
FIG. 4B depicts a second GUI state for a recipient's personal mobile device in accordance with the present disclosure.

FIG. 4B depicts a later second state 420 of the GUI where the status 424 of the planned reservation or appointment (428) is now changed from the earlier provisional status 214 to the "CONFIRMED" state and an additional block 426 is inserted to indicate that the order has been pre-paid for. In one embodiment, block 426 also includes an optically scannable barcode that validates the confirmed and prepaid status of the order (the one identified in field 422). In one embodiment, the confirmed status may also be indicated in a wireless message that the recipient's device 262 may be induced to provide (via a pre-loaded background peripheral service or BPS) when wirelessly interrogated. Field 428 now indicates that there is approximately three minutes left in a running countdown for the appointment. In this example field 429 is changed to instruct the user to pull up into an identified drive through lane (e.g., DriveWay #2) when the countdown clock reaches zero. It is within the contemplation of the present disclosure that rather than showing similar instructions as those in field 419 of FIG. 4A, the instructions could have been changed to redirect the recipient elsewhere due to changed circumstances. For example they may say, "Please pull into reserved parking space 141$x$ (e.g., a specific space among spaces 141$a$-141$n$ of FIG. 1) and wait until the appointment countdown reaches 0 before entering the pre-paid quick drive-through lane."

Still referring to FIG. 2, in one embodiment the interjected provisioning delay 273 is a variable one that depends on whether or not the identified recipient has begun traveling towards the planned goods/services provisioning spot (262$f$, $g$). If not, the interjected provisioning delay may be extended as indicated by additional portion 273' (ProDelay-1b). In one embodiment, during the initial preparation/production delays 273, 273' (ProDelay-1a, 1b), the order/reservation receiving entity (271) may send one or more requests for acquiring the current location 262$b$ (and optionally speed and direction) of the recipient's device 262 to determine whether or not the recipient has started traveling towards the planned destination (262$f$,$g$) and if so, how much progress has been made and can be expected to be made in the near future. Responses to these additional one or more requests is represented by upload communication 283. In response, the receiving end makes a more accurate and second prediction 292 (Predict-2) about when to expect arrival of the identified recipient (Um) at the planned destination (262$f$,$g$).

The more accurate second prediction 292 may affect the length of the combined initial production delays 273, 273' (ProDelay-1a, 1b) by either shortening or lengthening them as appropriate. Block 274 represents the initiation of the preparation/provisioning of the requested goods/services. The specifics of such initial preparation/provisioning 274 will vary from establishment to establishment as based on different contexts. For example, in a fast food providing environment (e.g., 100 of FIG. 1) a first step in preparing to fulfill an order may comprise generating a physical order ticket, gathering certain utensils (e.g., pots, pans, trays) and raw ingredients used for cooking or otherwise processing the food items that are to ultimately be provided in accordance with the order. Yet more specifically, a number of frozen meat patties may be dispensed onto a preparation tray depending on whether the order asks for a single, double or triple burger stack; a number of different fresh vegetable items may be gathered (e.g., onions, lettuce, pickles, condiments) depending on whether or not the order asks for them. The top and bottom bun sections may be stacked adjacent to these raw materials. An empty drink cup of appropriate size may be dispensed. However, none of the gathered items are irreversibly altered by for example cooking, toasting and/or stacking them together at this phase. If the order is canceled, the utensils and/or raw materials may be returned to their originating bins as may be allowed by food safety rules.

Uplink communications 284 and 285 represent yet further indications of the recipient's state (represented as being inside a moving vehicle) as that person advances from location 262$b$ to a closer location 262$c$ and beyond. The indicated progress of the recipient may result in yet further predictions about arrival time (ETA) and may serve as justification for progressively advancing the initial preparation of utensils and/or raw materials to a next station or step among initial provisioning steps A, B, C, . . . (represented by block 274). For example, in the fast food context some of the less expensive raw items may now be mixed together but the more expensive frozen meat items are not yet placed on the grill. Also the timing for placing the frozen meat items on the grill may depend on whether the order requested the meat to be cooked as well done, medium or rare.

In the illustrated example, recipient position 262$d$ represents a possible stall in the previous progress (262$b$, 262$c$) made towards arriving at the planned destination (262$f$,$g$) in accordance with a currently proposed appointment time (ETA). The reasons for the stall 262$d$ may be many. Perhaps the recipient has run into unexpected traffic congestion. Perhaps the recipient has decided to make a midstream chore stop, for example at another store to buy gasoline or to pick up an item needed at home (e.g., milk). Alternatively, the goods/services providing establishment (271, 274, e.g., 100) has sent a request (286) to the recipient to stop his/her advancement and/or a request (290$a$) to think about making a chore stop (290$b$) at another establishment (may be even automatically suggesting a nearby one) because production at the goods/services providing establishment is currently backed up (e.g., due to unexpected surge in demand or unexpected loss of some production equipment) and thus the appointment time has to be changed to a later time. After the side chore 290$b$ is done, the system my suggest in communication 290$c$ that the recipient proceed to location 262$c$ and await further instructions. Concomitant with this change of plans, a new prediction 295 (Predict-5) is generated based on the latest uplink communications 286 (which are shown to be bidirectional if the establishment down links a new appointment time—i.e. 448 of FIG. 4D—and/or other instructions—i.e. 449—).

When it becomes relatively certain (e.g., a probability of better than 66%) that the goods/services providing establishment can timely fulfill the reservation and/or order for the requested goods/services, the provisioning entity down links a confirmation communication 277 to the recipient's mobile device (262) and instructs the recipient to advance to the planned provisioning spot (262$f$,$g$) accordingly. Alternatively, based on circumstances, the provisioning entity may elect to use transmission 277 to further delay the appointment time or time window or to even, if conditions necessitate it, cancel the order from their end or propose alternative substitutes (e.g., because certain items have run out of stock). From the recipient's perspective, it is better to get early warning of changed circumstances rather than to waste time advancing to the planned provisioning spot (262$f$,$g$) and then learn of the changed circumstances at the last minute. Bidirectional communications 287 at the further advanced location 262e represent a quickening rate of back and forth communication between the recipient and the provisioning establishment as the recipient comes closer and closer to the planned provisioning spot (262f,g). In one embodiment, this quickening rate of back and forth communication includes the activating of fine resolution locaters for more precisely determining of the location of the recipient (Um) and/or a vehicle carrying the recipient. For example the activated fine resolution locaters may include Bluetooth™ and/or 5G WiFi transponders provided in the parking lot 140 and along the drive-through lane 110.

Concomitant with a confirmation (277) of the planned provisioning of goods/services, the provisioning establishment continues in block 278 with further and finalizing preparation and provisioning steps following initial steps A, B, C, . . . in block 274. These finalizing provisioning steps may be denoted as, . . . X, Y, Z (not to be confused with a spatial frame of reference such as 105) and may take place at a location different from that of initial steps A, B, C, . . . . For the fast food context, the finalizing provisioning steps may include finishing off the cooking of the hot foods and cooling of the cold items so that they can be provided hot and fresh or appropriately cold at the appointed time and place. The finalizing provisioning steps may also include the packaging of the various food items so they can be quickly handed to the recipient (e.g., at quick drive through window 112 of FIG. 1). The depicted provisioning spots (262f,g) may represent a number of different options. As was indicated in FIG. 1, a recipient may ask to (or be instructed to) drive a vehicle into a fast pre-paid drive-through lane or through a slightly slower drive-through lane which has a payment window or alternatively the recipient may ask to (or be instructed to) park his/her vehicle in a reserved spot in the parking lot 140 and then walk into the pedestrian interface section 120 and wait in a queuing area, 121 or 122, for receipt or pick up of the requested goods/services. Alternatively, the establishment may feature a sidewalk pickup window to which the recipient is directed. The depicted provisioning spot 262f represents the case where provisioning is provided to the vehicle. The depicted provisioning spot 262g represents the case where provisioning is provided to the recipient in a pedestrian interface section such as 120. In some embodiments, the recipient is instructed (see field 439 of FIG. 4C) to proceed according to a slightly different course of action than originally planned.

Figure 4C:
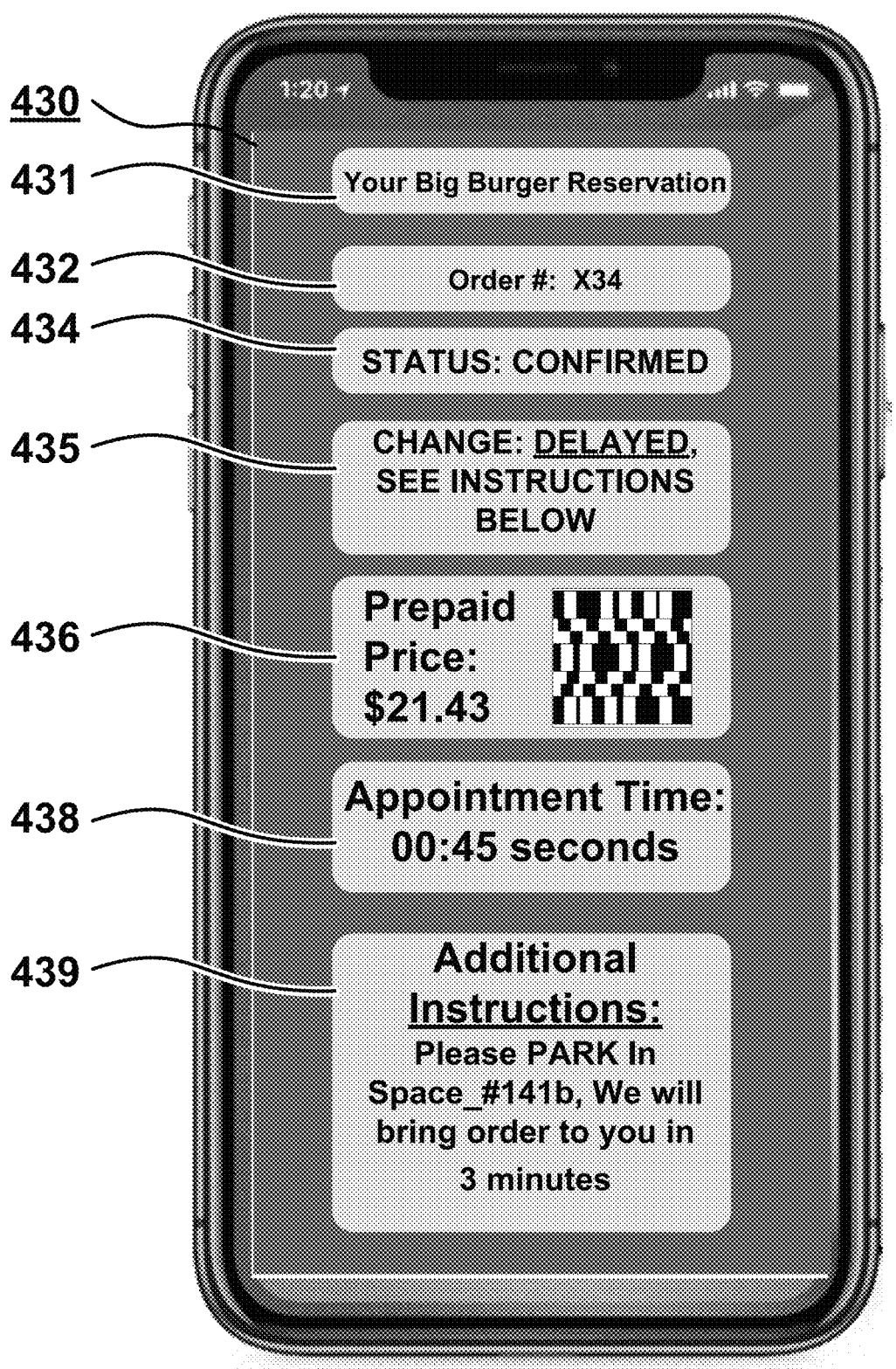
FIG. 4C depicts a third GUI state for a recipient's personal mobile device in accordance with the present disclosure.

More specifically, in the example of FIG. 4C, a revised GUI state 430 is presented on the recipient's mobile device 262 where the recipient is instructed to not pull up into a drive-through lane but to instead park in a known-to-be-empty spot (e.g., number 141b per instruction 439) where the requested goods and/or services will be delivered there in a short time (e.g., within 3 minutes) by a waiter. In other words, the recipient is being informed ahead of time of a specific manner in which the requested goods and/or services will be provided. New field 435 warns of the changed circumstances. In one embodiment, the new instructions may also be voiced through the recipient's mobile device 262 or by way of another audio device. In one embodiment, the change notification may indicate that initially ordered items have run out of stock and ask the recipient if he/she is willing to accept proposed alternatives or if he/she wishes to cancel that part or the whole of the order.

After the requested goods and/or services (and/or acceptable alternatives) are delivered, in one embodiment, the fine resolution scanners (e.g., 127) determine that the serviced recipient has moved on (e.g., to location 262h) thus clearing space in the corresponding provisioning spots 262f and/or 262g for a next in-line patron or next-on-wait-list patron. In one embodiment, one or more wait-lists (not shown, see FIGS. 5A-5B) stored in a database, are updated to indicate that the identified recipient has been serviced, that the requested goods and/or services have been provided and to advance other waiting patrons and/or orders forward on the respective wait-lists and optionally to re-sort the wait-lists based on expected arrival times of different other patrons and/or determined priorities of their orders/reservations and abilities to deliver on time and/or at the scheduled places. Communication 288 may be sent to a next in line or next-on-wait-list patron (e.g., one at location 262e) to advance into a now-available provisioning spot 262f or 262g. Alternatively or additionally, communication 289 may be sent to a further away and/or further back on the wait-list patron (e.g., one at location 262d) informing that patron of his/her progress in moving forward along the wait-list. (see FIG. 4D and FIG. 5A).

Figure 4D:
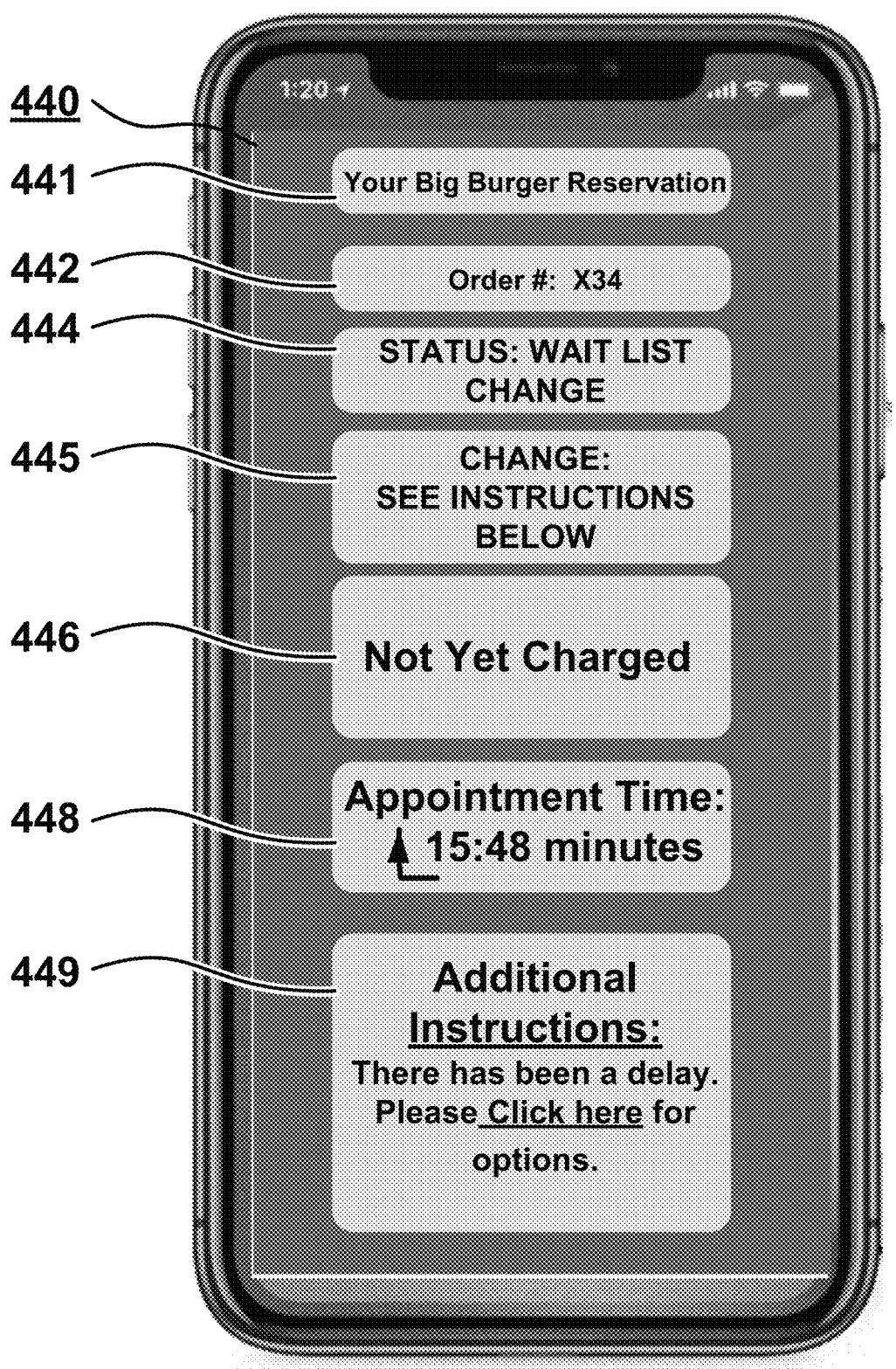
FIG. 4D depicts a fourth GUI state for a recipient's personal mobile device in accordance with the present disclosure.

Referring to FIG. 4D, in one embodiment, patrons whose respective orders/reservations/appointments are queued on a changing wait-list are automatically and repeatedly informed of changes on the list so that they may tailor their actions accordingly. The illustrated GUI 440 includes a notification 444 that there has been a change to the wait-list. Notification 445 may instruct the patron to refer to more detailed instructions provided elsewhere. In this example, notification 446 informs the patron that his/her charge card (or other financial account) has not yet been charged. Notification 448 informs the patron that the wait time has been increased (e.g., relative to 418 of FIG. 4A). Notification 449 allows the patron to link to a next page that provides more details including suggested options for the patron in view of the changed appointment time/place and/or delayed/changed/cancelled order.

Referring to FIG. 5A, in one embodiment, automatically repeatedly updated wait-list tables (e.g., 500, 505, but there could be more) are stored in a database controlled by the establishment. As illustrated (in nonlimiting fashion), requested goods and/or services are respectively identified by unique TIDs (second column of database table 505). In one embodiment, a subset of the TID sequence (e.g., "x34" in the second row) is used to represent the order ID to the customer while the rest is known only to the establishment. The current position of each TID-identified transaction in the wait-list may be indicated by a wait-list position identifier (first column). The wait-list position may or may not represent the currently planned order of provisioning of the requested goods and/or services. The wait-list table (e.g., 500) may be dedicated to provisioning at one specific provisioning spot (e.g., at the pre-paid drive through window) or a number of such spots and/or to the provisioning of a specified class or subclass of goods/services. In the latter case, additional columns (not shown) in the wait-list table 505 may identify the planned provisioning spot and/or a subclass in the specified class of goods/services.

In the illustrated example of the first wait-list table 500, the third column indicates the currently known location of the identified recipient (identified by the corresponding TID and by a cross associated other database table (not shown) linked to the same TID). The fourth column indicates the currently known velocity of the identified recipient. Positive velocities may indicate progress towards the planned provisioning spot 262f or 262g while negative ones may indicate movement away. The fifth column indicates a currently computed distance away. The computed distance away is also referred to herein as "separation" and may come in a variety of forms depending on needs of the provider. The separation can be expressed in terms of one or more of a radial, as-the-crow-flies distance or may be an effective distance based on expected roads/paths to be travelled and optionally on currently known speed limits and/or other traffic conditions on those roads/paths. Separation may be expressed in terms of chronological distance rather than or as well as in terms of spatial distance. In one embodiment, when effective distance (e.g., D1) increases due to newly detected traffic conditions (or other impediments), the progress relating GUI (e.g., FIG. 4D) may notify the recipient of a changed appointment time and/or provisioning spot due to newly detected traffic conditions. In one embodiment, rather than just determining actual distance (e.g., radial, as-the-crow-flies distance) and/or effective distance (based on path lengths and optionally on traffic conditions), the system may alternatively or additionally determine and store effective chronological distance (separation time apart) of the respective recipient based on lengths of predicted paths to be taken and optionally on current or estimated traffic conditions. In one embodiment, a progress advisement program that advises the recipient for example with the GUI's of FIGS. 4A-4D may additionally provide the recipient with alternate navigation suggestions. The alternate navigation suggestions may help the recipient get to the establishment sooner, or optionally later, depending the status of the order preparation and/or production.

The sixth column in the first wait-list table 500 may indicate a currently assigned priority value for the respective goods/services. The assigned priority value may change due to changed circumstances. In one embodiment, the row entries in the table 500 and currently planned appointment times (seventh column, which in one embodiment presents a count down value in hours/minutes/seconds format) may be automatically repeatedly re-sorted and updated based on changing priority assignments. In the illustrated example, the eighth column indicates degree of order completion. There may be more columns with other forms of relevant information or a fewer number of columns.

While the first wait-list table 500 represents provisioning of goods/services to specific customers that the provider has committed to (has confirmed their orders/requests), the second wait-list table 505 represents online requests for goods and/or services that the provider has not yet committed to (has not confirmed). Thus at least the planned appointment times (seventh column) are indicated as currently undefined. Row items from the second wait-list table 505 may be moved up to the first wait-list table 500 as room and/or servicing bandwidth becomes available. The move to the first wait-list table 500 may be based on order in the second wait-list table 505 or on other factors such as separation (e.g., distance away) and currently assigned and competing priorities.

FIG. 5B depicts other possible wait-lists (507 and 509) that may be stored in the establishment's database and used for managing order preparation/processing and customer advancement along various physical and/or virtual queue lines. Third database table 507 tracks the progress of respective, committed-to orders/appointments. As seen the third column identifies the current location of the requested goods and/or service-provisioning resources. In the illustrated example, there are various production stations where the physical states of the items are transformed and various preparation stations where needed materials (and/or service providers) are gathered and/or arranged in preparation for subsequent production steps. There can also be pre-preparation stations where almost nothing significant is done except that an order ticket is advanced physically and/or virtually. The seventh column (and/or yet further columns) of the third database table 507 may provide additional details relating to the progress of the respective order.

The fourth database table 509 may track capacity availabilities at respective goods/services provisioning spots under control of the establishment. If one provisioning spot exceeds a corresponding and predetermined threshold for how full it is allowed to become, the order may be changed so as to have a different planned provisioning spot. The listed examples of possible provisioning spots is nonlimiting. In addition to interior seating, the establishment may have sidewalk seating, sidewalk pickup windows or counters or even delivery to cars parked along adjacent public streets (where the establishment's fine resolution scanners can locate the corresponding patrons as being located in those spots).

Referring to FIG. 3, illustrated is a system 300 configured for location sensitive queues and wait-lists management where the system 300 includes portions for automatically determining both coarser and pinpointed respective locations (e.g., LocU1, . . . , LocUm) of respective mobile users (e.g., U1, U2, . . . , Um) using their respective personal mobile devices (e.g., 315, . . . , 31m) carried and/or worn by the users as the users traverse various areas including those serviced by cellular telephony base stations (e.g., cell towers 253a'—see also 253a of FIG. 2), serviced by GPS satellite constellations 253b' (see also 253b of FIG. 2) and serviced by finer resolution, location determining means (e.g., scanners 327—see also 127, 127', 127" of FIG. 1). Although the present disclosure focuses mostly on Bluetooth™ based scanners, it is within the contemplation of the disclosure to use other types of scanners such as WiFi ones (e.g., generation 5G ones that provide aimed beams). When a user enters a repeatedly scanned finer resolution area (e.g., 327 corresponding to 127, 127' and 127" of FIG. 1) that is covered by corresponding scanners 127a, 127b, . . . , 127n (n indicating the number of scanners in area 327) the users' respective locations can be determined to a finer degree of resolution than that possible with just GPS and/or cellular telephony resources.

As indicated in magnified details area 315', the exemplary respective mobile device 315 of exemplary user U1 typically has a predetermined operating system (OS) 313 currently executing within it. Device 315 may have a set of application program-to-OS interfaces (APIs) 314a for allowing various further programs 317 within the device 315 to access resources of the OS 313. In one embodiment, the OS allows for OS mediated control over local telephony resources 314b, WiFi interface resources 314c (e.g., including generation G4 resources), Bluetooth™ resources 314d, and GPS resources 314e. One of the API accessible resources of the OS is that for establishing one or more background peripheral services (BPSs) 318 that may be dynamically and wirelessly connected to from external devices (e.g., scanners 127a-127n). The executing OS 313 may on its own periodically test for presence of nearby Bluetooth™ and/or WiFi devices (e.g., scanners 127a-127n, 5G WiFi routers 129a, 129b and alike other such short range transceivers) and in response to detected presence, occasionally wirelessly broadcast its own Bluetooth™ and/or WiFi beacon or advertising signal which includes a current hardware accessing code (HAC) of the mobile device 315. In one embodiment, the Bluetooth™ advertising signal has a unique and consistent signature portion that can be used for locating the HAC code as being positioned at a predetermined bit position of fixed bit distance away from a unique signature portion of the beacon or advertising signal. The HAC code may extracted based on its predetermined bit position relative to the signature even though the HAC code itself changes on a pseudorandom basis. The schematic of FIG. 3 illustrates the code for occasionally transmitting a rotating HAC as being disposed at section 319 of the personal mobile device. The schematic of FIG. 3 also depicts one or more of established BPSs at area 318. One of the BPSs is one which transmits a Bluetooth™ signal including an associated TID (temporary transaction ID sequence) when that BPS is connected to. Another of the BPSs is one which transmits a WiFi signal revealing the current GPS coordinates of the mobile device 315 as well as identifying the mobile device (e.g., by its currently assigned TID). This WiFi signal can be routed out via the internet to a server (e.g., 340b) controlled by the establishment. Another of the BPSs is one which transmits a WiFi signal revealing the current cellular telephony coordinates of the mobile device 315 as well as identifying the mobile device (e.g., by its currently assigned TID). This WiFi signal can be routed out via the internet to a server (e.g., 340b) controlled by the establishment. The establishment controlled server (e.g., 340b) may then determine current coarse locations of the mobile device based on the received GPS and/or telephony information and store the results in corresponding database entries (e.g., 34 m.5).

Various foreground programs that may be used by the user while waiting for provisioning of the requested goods and/or services are depicted as being present in area 317. APIs to the local apps in the mobile device are depicted as being present in area 314f. One of the foreground programs that will be running in region 317 in accordance with the present disclosure is the vendor's ordering and order progress advisement program. The GUI's shown in FIGS. 4A-4D are some examples of the order progress advisements that the program may provide to a prospective recipient. An example of an initial, program launching GUI for the mobile device is depicted at 315 with application invoking icons such as 311 and 312 being present on the displayed graphical user interface. One of the application invoking icons (e.g., 311 or 312) may cause a launching of a vendor's ordering and order progress advisement application. This application is stored in area 317 after being downloaded for example from a vendor controlled server 340a located in cloud 330 or elsewhere on the Internet 320.

FIG. 3 more broadly depicts an integrated client-server/internet/cloud system 300 (or more generically, an integrated multi-device system 300) within which the here disclosed technology may be implemented. System 300 may be understood as being an automated machine system having distributed intelligent resources including a variety of differently-located data processing and data communication mechanisms including for example, user-carried/worn mobile wireless units (e.g., wireless smartphones 315, . . . , 31m) configured to allow end-users thereof (e.g., U1, U2 . . . Urn) to request from respective end-user occupied locations (e.g., LocU1) services from differently located enterprise hosts (e.g., on-internet 320 and/or in-cloud servers 340a, 340b, etc.). In one embodiment, server 340a handles the downloading of vendor ordering and order progress advisement apps into mobile devices that request them. The downloading process may include generating unique customer profiles (e.g., including billing information) and customer identifications that are to be used when the respective customers place orders at a later time. In one embodiment server 340b handles the managing of placed orders. Server 340b may include or connect to an order management database which keeps track for each order-placing user (e.g., user Urn, where m is an integer) of: (a) the user's customer profile 34 m.1, (b) the details of the placed order 34 m.2; (c) a temporary and unique transaction identification sequence (TID) 34 m.3 assigned to the corresponding transaction; (d) a current hardware address (e.g., HAC) being currently used by the customer's personal mobile device (e.g., 31 m.4); (e) a current one or more coarse and comparatively more pinpointed locations 34 m.5 of where the recipient is determined to most likely be present at (e.g., in or near the establishment or further away); (f) information about the delivery status 34 m.6 of the requested goods and/or services that the present transaction is directed to; and optionally additional information as may be appropriate for the vendor's business model.

It is to be understood that the illustrated configuration of system 300 is merely exemplary. As indicated, it comprises at least a few, but more typically a very large number (e.g., thousands) of end-user devices 315 (only a few shown in the form of wireless smartphones but understood to represent many similarly situated mobile and/or stationary client machines—including the smartphone wireless client kinds, smart watches, and cable-connected desktop kinds). These end-user devices 315 are capable of originating service requests which are ultimately forwarded to service-providing host machines (e.g., in-cloud servers like 340b) within a cloud environment 330 or otherwise on-internet or linked-to internet machines (e.g., 140). Results from the service-providing host machines are thereafter typically returned to the end-user devices (315, . . . 31m) and displayed or otherwise communicated to the end-users (e.g., U1, U2, . . . , Um, m being an integer). For example, if the business of the vendor is an online, food pre-ordering one, the end-user (U1) may have installed on his/her smartphone (315) a software application ("app" 317) that automatically requests from the order managing server 340b, a list of nearest vendor venue locations, the menu of the items that may be ordered online and estimates for when the items will be ready for pick up at a selected one of the venues. In response to the request, enterprise software and hardware modules automatically identify the user, pull up a user profile (e.g., 34 m.1), store the order details (34 m.2), assign a temporary and unique transaction identification sequence (TID) 34 m.3 to the corresponding transaction (install it into a corresponding one or more BPSs) and inform the customer of a time range when he or she might arrive at the venue to pick up the order as well a specific location for the pickup (e.g., a drive-through window). The assigned TID may be downloaded into the BPSs of the ordering app at that time order placement or at a later time before it is needed.

When the customer (e.g., Um) arrives at the designated venue and enters an area covered by the location pinpointing scanners (127a-127n) of the venue, a fine resolution locating process is automatically carried out. Briefly, the presence of the HAC advertising mobile device is detected; an attempt is made to dynamically connect wirelessly to the TID-returning BPS of that mobile device; the TID is detected by at least one of the location pinpointing scanners (127a-127n) and the respective strengths of the TID-providing signals are measured at respective ones of the scanners. More specifically and merely as an example, if TID-returning signal 128b has the same relative strength as TID-returning signal 128n then it may be automatically determined that the corresponding mobile unit 31m is located midway between scanners 127b and 127n. As another example, a set of scanners forming a closed regular polygon and each receiving the TID at just above a predetermined signal strength threshold are identified and the personal mobile device is automatically determined to be at the center of formed polygon (e.g., a triangle, rectangle, etc.). The scanners report their respective detections and measurements to a local server 336. The local server 336 then consults with a database or expert rules knowledge base to pinpoint the most likely one or more locations for the targeted customer in view of other factors (e.g., background noise, radio reflections, etc.) that may be currently present at the venue. The pinpointed one or more locations are then relayed to the tracking database, for example into entries region 34 *m*.5. The entries region 34 *m*.5 may store a history of recent locations and prediction of where the tracked user is most likely to be next located. A human or robotic server for assisting in quick delivery of the requested goods and/or services may then be dispatched to the predicted location of the customer.

In one embodiment, signal coupling from each of the fine resolution scanners (127*a*-127*n*) to the local server 336 is a wireless one such as conducted over a Wi-Fi network. Alternatively, Bluetooth™ signals may be used where one scanner (e.g., 127*a*) relays its detections and measurements to the next adjacent scanner (e.g., 127*b*) and so on until the collected detection and measurement reports are relayed to the local server 336. Signals coupling link 335 represents the various ways in which the respective detections and measurements of the scanners (127*a*-127*n*) are relayed to the local server 336. The signals coupling link 335 may be a wired one and/or may include wired and wireless subportions as opposed to being an all wireless signals coupling link.

In one embodiment, after receiving the respective detections and measurements of the scanners as well as the detected TID sequence, the local server 336 connects via the Internet 320 to the order management server 340*b*. The order management server 340*b* uses the relayed TID sequence to reference the corresponding customer order details 34 *m*.1- 34 *m*.7 of user Um and his/her corresponding order. The order management server 340*b* may additionally consult with an expert knowledge base 356 (example shown in server 340') to determine, based on the relayed signal measurements of the scanners, what the one or more most likely current locations of the customer are at the respective venue and for the extant conditions there. When the ordered goods and/or services are ready for delivery to or pickup by the customer, the order management server 340*b* reports the latest one or more most likely locations of the establishment. For example the report may be in the form of a sorted list of most to least likely locations. In one embodiment, after pickup or delivery is reported as complete, the corresponding TID is erased from the user's mobile device and also from the database storage locations (e.g., 34 *m*.3) so as to preserve privacy.

Aside from the end-user devices (e.g., 315, . . . , 31*m*) and the cloud servers (e.g., 340*b*) the system 300 comprises: one or more wired and/or wireless communication fabrics 316, 325, 335 (shown in the form of bidirectional interconnects) intercoupling the end-user client devices (e.g., 315, . . . , 31*m*) with the various networked servers (e.g., 336, 340*a*, 340*b*, 340').

Still referring to FIG. 3, a further walk through is provided here with respect to detailed components that may be found in one or more of the mobile devices and/or respective servers. Item 311 represents a first user-activateable software application (first mobile app) that may be launched from within the exemplary mobile client 315 (e.g., a smartphone, but could instead be a tablet, a laptop, a wearable computing device; i.e. smartwatch or other). Item 312 represents a second such user-activateable software application (second mobile app) and generally there are many more. Each end-user installed application (e.g., 311, 312) can come in the form of nontransiently recorded digital code (i.e. object code or source code) that is defined and stored in a memory for instructing a target class of data processing units to perform in accordance with end-user-side defined application programs ('mobile apps' for short) as well as to cooperate with server side applications implemented on the other side of communications links 316, 325, etc. In one embodiment and the case where an order is placed for respective goods and/or services by way of a non-mobile or not normally used client machine (e.g., a desktop computer), the order management server 340*b* automatically recognizes this condition and uses data available in the customer's profile 34 *m*.1 to access the user's normally carried, personal mobile device and to transfer the assigned TID to that normally carried personal mobile device. In this instance, it is understood that appropriate, vendor provided software has been preloaded into the normally carried personal mobile device for securely enabling such transfer of the TID to the targeted mobile device. In this way, even if the customer places the order by way of a home desktop computer and then arrives at the venue with his/her normally-used mobile device, the customer tracking subsystem will still work.

More generally, each app (e.g., 311, 312, 317) may come from a different business or other enterprise and may require the assistance of various and different online resources (e.g., Internet, Intranet and/or cloud computing resources). Each enterprise may be responsible for maintaining in good operating order its portions of the system (e.g., local scanners, local servers, Internet, Intranet and/or cloud computing resources). Accordingly, the system 300 is shown as including in at least one server 340', an expert knowledge base 356 which contains various kinds of different expert rules for handling different conditions. One set of expert rules may provide for optimized customer location pinpointing when all the scanners (e.g., 127*a*-127*n*) at a given venue or venue observable area 327 are operational. Another set of expert rules may provide for less than optimum but acceptable customer location pinpointing when less than all of the scanners are operational and/or background noise is high. Yet another set of expert rules may provide for variable location determination based on different sets of furniture layout at each respective venue and/or based on expected radio interferences and/or reflections at the given venue. Yet other of the expert rules may relate to categorizing different types of transactions and details about how to handle them, including how to resolve various problematic issues.

In addition to the expert knowledge base 356, one or more other portions of the system 300 may contain interaction tracking resources 351 configured for tracking interactions between customers and respective vendors and an interactions storing database 352 configured for storing and recalling the tracked interactions. Links 353*a* (to a further server 340*c*), 353*b*, 353*c* and 353*d* represent various ways in which the system resources may communicate one with the other.

As mentioned, block 340' is representative of various resources that may be found in client computers and/or the various servers. These resources may include one or more local data processing units (e.g., CPU's 341), one or more local data storage units (e.g., RAM's 342, ROM's 343, Disks 346), one or more local data communication units (e.g., COMM units 347), and a local backbone (e.g., local bus 345) that operatively couples them together as well as optionally coupling them to yet further ones of local resources 348. The other local resources 348 may include, but are not limited to, specialized high speed graphics processing units (GPU's, not shown), specialized high speed digital signal processing units (DSPU's, not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, "local" resource units (e.g., 341-348) may include or may be differentiated into more refined kinds. For example, the local CPU's (only one shown as 341) may include single core, multicore and integrated-with-GPU kinds. The local storage units (e.g., 342, 343, 346) may include high speed SRAM, DRAM kinds as well as configured for reprogrammable, nonvolatile solid state data storage (SSD) and/or magnetic and/or other phase change kinds. The local communication-implementing units (only one shown as 347) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™ and so on). Similarly, the other local resources (only one shown as 348) may operatively couple to various external electromagnetic or other linkages 348a and typically operate in accordance with various ones of predetermined operating protocols. Additionally, various kinds of local software and/or firmware may be operatively installed in one or more of the local storage units (e.g., 342, 343, 346) for execution by the local data processing units (e.g., 341) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

The advantages of the present teachings over the art are numerous. It is to be understood that the present teachings are not to be limited to specific disclosed embodiments. In the above description and for sake of simplicity, a fast food restaurant venue is described. However, this disclosure may be applied, but not limited to, theaters (e.g., dinner theaters), stadiums, arenas, train stations, airports, big box store pickup areas and many other venues where it is desirable to track and pinpoint the location of a user of a normally carried and/or worn personal mobile device without encumbering the user to carry other devices not belonging to the user and/or not normally carried by the user.

Figure 6A:
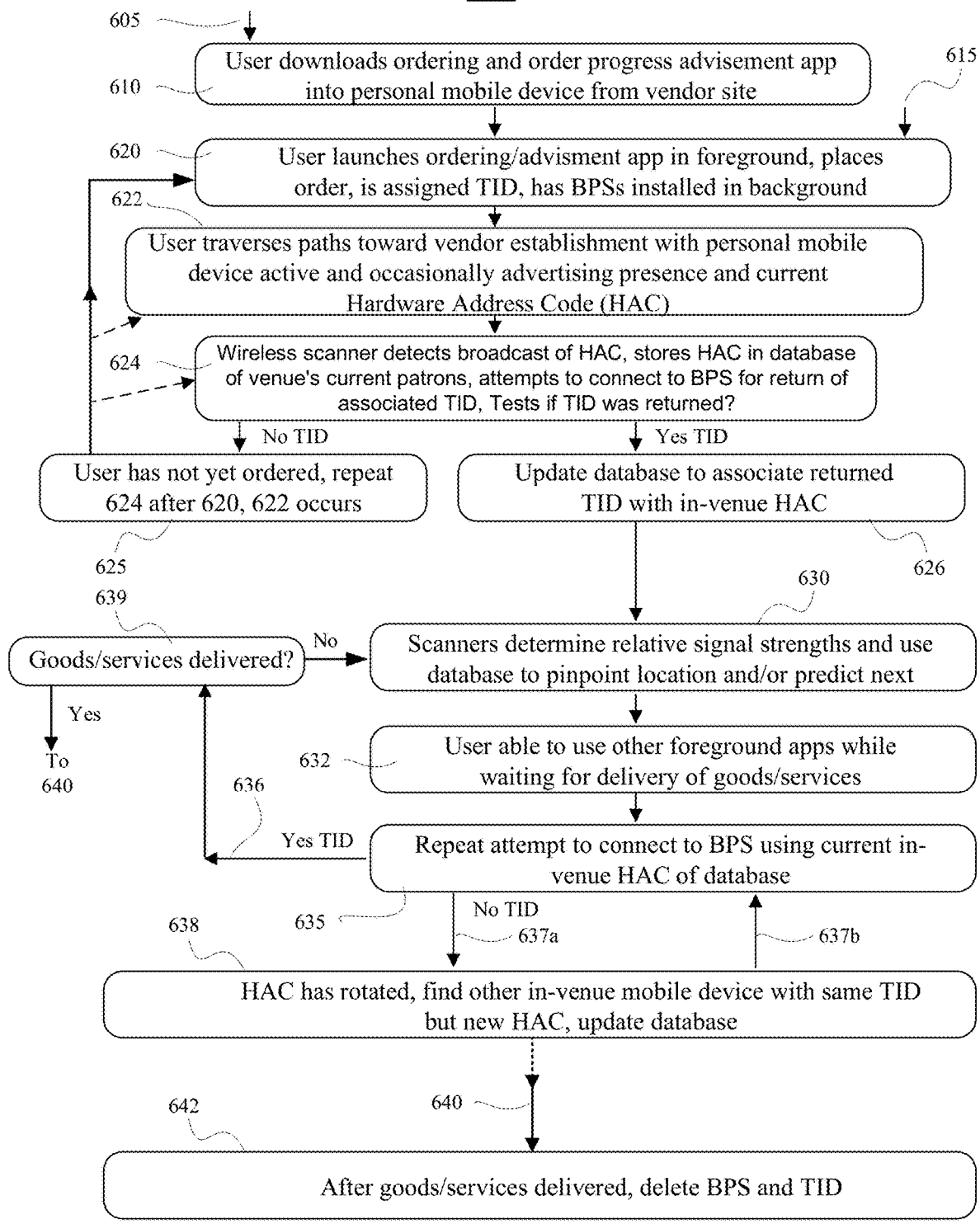
FIG. 6A is a flow chart of a tracking method that includes fine resolution tracking.

FIG. 6A illustrates a method 600 for receiving requests (e.g., orders) for goods and/or services from patrons (e.g., 261), determining spatial and/or chronological separation distances of identified recipients (e.g., 262) of the goods/services from scheduled provisioning spots (e.g., 262f,g) where the method includes determining spatial and/or chronological distance to a relatively fine level of resolution (e.g., to within two feet of pinpoint location or within seconds away of arrival time) for each identified recipient when that recipient enters an area scanned by the establishment, the fine resolution method using a personal mobile device carried by the recipient. Entry for first-time use of the method 600 may occur at 605, whereas later entry may occur at 615. In step 610 a user downloads into his/her normally used personal mobile device (e.g., smartphone 315, or a smartwatch or another normally or routinely carried and/or worn personal wireless device) an order or request submitting and progress advisement application (app) that is configured for placing orders or requests to one or more prespecified vendors and/or vendor venues (e.g., fast food establishments, sit-down restaurants, big box store item pickup areas) and for then providing an identified recipient with progress information such as when, where and how to receive the requested goods and/or services. It is within the contemplation of the present disclosure that the order or request submitting portion and the progress advisement portion are provided as two or more separate programs rather than one combined app. The order or request submitting and progress advisement application (app) may be downloaded via the Internet and from one or more vendor-specified websites. In one embodiment, the order or request submitting app may first be downloaded into a desktop or laptop computer of a user (e.g., 261) and used for ordering where after the progress advisement portion is transferred into a personal mobile device (e.g., 262) of an identified recipient (could be same as the order placer) for execution in that personal mobile device (e.g., 315).

In a subsequent step 620, the user launches the app as a foreground executed process on his/her normally used personal mobile device (e.g., smartphone 315) and orders or requests various goods and/or services for provisioning at one or more app-compatible vendor venues in accordance with order-placing guidances provided by the app. Typically, the app will cooperate with an in-cloud server and obtain an identification of the user and an identification of a time range in which the user expects provisioning of the ordered goods and/or services to occur. Once the ordering details are completed, the in-cloud server will download a unique and temporary identification number or other sequence (TID) to the personal mobile device (315) where this TID is uniquely associated with the specific order. The app will also establish within the user's personal mobile device one or more background peripheral services (BPSs) which may be dynamically connected to by external devices (e.g., the scanners 127a-127n at or near the vendor's venue). When a first of these established BPSs is connected to, and it temporarily awakens, broadcasts a Bluetooth™ signal containing the TID that has been assigned to the order and then goes back to sleep. The first BPS does not block the user from accessing foreground applications or services on his/her personal mobile device and does not consume significant battery power. Steps 610 and 620 may be carried out in the user's transport vehicle, home, office or elsewhere as convenient. They need not occur while the user is present in the vendor's scanners-covered establishment. In one embodiment, a second of the BPSs causes the user's mobile device to relay to a vendor accessible server (e.g., 340b), current location information of the mobile device as determined based on connection to cellular telephony equipment. In one embodiment, a second of the BPSs causes the user's mobile device to relay to a vendor accessible server, current location information of the mobile device as determined based on received GPS signals.

In a subsequent step 622 the user (U1) travels towards the establishment and eventually enters a scanners-covered area of the vendor's establishment while carrying his/her normally used mobile device (e.g., smart phone 315). For one class of embodiments (e.g., Apple iPhones™) the operating system (OS) of the mobile device automatically detects presence of external Bluetooth™ devices and occasionally broadcasts its own Bluetooth™ signals to thereby autonomously advertise its presence in the area and declare a current hardware address code (HAC) by way of which the personal device may be addressed. In one embodiment, the OS occasionally changes the HAC by which it is to be addressed.

In step 624 a Bluetooth™ receiver (e.g., one of scanners 127a-127n) detects the advertised HAC and checks a local database to determine if that HAC is already recorded in an area of the database listing current in-venue HAC's. If not there, the new HAC is added to the current in-venue HAC's listing with a timestamp indicating time of first recognition (e.g., first entry) into the scanned area. Old HAC's having a timestamp earlier than a moving time window may be automatically deleted from the listing by a garbage collecting subroutine.

Also in step 624, the detected HAC is used to address the corresponding personal device and to attempt to dynamically connect to the aforementioned first background peripheral service (BPS) that may have been established inside that personal device. If it is true that the first BPS has been established inside that personal mobile device, the first BPS is temporarily awakened, it responds by transmitting a Bluetooth™ signal including the uniquely-assigned TID and then it goes to sleep again.

Step 625 represents the case where the addressed personal mobile device does not return a TID (No TID). There could be a number of different reasons for this. One of them is that the user has not yet placed an order using the ordering app. Another is that the user may have temporarily shut off his/her personal mobile device and/or temporarily stepped out and away from the scanners-covered area. In such cases control is returned to one of steps 620, 622 and 624 as appropriate. The dashed return lines represent the selective choice of which of steps 622 and 624 is to be returned to based on circumstances.

Step 626 represents the case where the addressed personal mobile device does (Yes) return a TID. This condition informs the system that the in-venue and responding personal mobile device (315) has been used to place an order and the returned TID identifies that order (and optionally the person who placed the order, when so done and from where and/or who is to be the recipient of the requested goods and/or services). The local database is then updated to logically associate the current HAC of the responding mobile device with the returned TID and with the corresponding order of requested goods and/or services (e.g., as provided via pickup window 112).

At subsequent step 630, each of the individual scanners in the scanners-covered area (e.g., 327) determines if it received the returned TID and if so (if the transmitted signal has a strength above a predetermined signal strength threshold), at what relative level of signal strength. The determined relative levels of signal strength (where 0 may indicate no TID signal detected above background noise at this time and 10 may indicate a TID detected at maximal signal strength) are returned to the database for analysis. In one embodiment an expert knowledge database system has location determining rules pre-stored in it for the respective local venue where the rules are heuristically developed and optimize the pinpointing of one or more most locations, to a desired level of resolution (e.g., to within 2 feet), of where the TID outputting mobile device is located. The determined pinpoint location is reported to an order management system. In one embodiment, the order management system tracks movements of the user and/or his/her personal mobile device so as to determine whether the user has settled at a relatively stable waiting location (e.g., 122) and what the coordinates of that location are or whether the user is advancing along a physical queue (e.g., 121, 110) towards a quick pickup window (e.g., 112) or counter. The order management system may then dispatch instructions to appropriate human and/or robotic service providers to advance or delay the preparation and/or production of the requested goods and/or services so that provisioning of the goods/services timely intersects with the determined or predicted location of the recipient in accordance with a current provisioning plan (e.g., one defined by wait-list 500 of FIG. 5A). Available level (e.g., fineness of) of location resolution may be dependent on the number of, closeness to each of the other of, and locations of the scanners (127a-127n) as well as whether all of them are operational, on background noise then present in the scanners-covered area, on signal strength measurement capabilities of the scanners, on radio signal reflection properties of the area, on transmission strengths of respective personal mobile devices of respective users and other factors.

Step 632 represents a waiting time for the being-tracked user (e.g., U1). During this waiting time 632, the user may access and use one or more foreground apps and/or services of his/her personal mobile device while not interfering with the occasional and temporary reawakening's of the TID-broadcasting first background peripheral service (BPS). The user-accessible one or more foreground apps and/or services may include games, web browsers, email applications, social media applications and so forth. The user therefore can be entertained or may conduct work tasks while waiting for delivery of the requested goods and/or services. One of the foreground apps and/or services may be the order progress advisement app (see GUI's of FIGS. 4A-4D) which advises the user about the progress of, and/or currently planned time, location and method of providing the requested goods and/or services to that user.

While the user is waiting (as represented by step 632), a concurrent and automatically repeated other step 635 attempts to reconnect to the established first BPS of the HAC-addressed personal mobile device so as to again awaken the first BPS, have it repeat its transmission of the corresponding TID and then go back to sleep. If in the HAC-addressed personal mobile device responds again with the assigned TID (Yes), flow path 636 is taken and as long as the requested goods and/or services have not yet been provided (as determined in step 639), control returns to step 630 from which the loop is repeated as long as a TID is returned at step 635. The frequency of repetition of connection re-attempting step 635 may be a variable one. Each time the connection attempt is made and responded to by the user's personal mobile device, battery power is consumed in the mobile device. Thus to minimize consumption of battery charge out of the personal mobile device, the scanning system may intelligently vary the rate of its connection re-attempts 635 based on inferred states of the user. More specifically, if the user appears to be settled into a relatively stable state (e.g., 122) with minimized relocation, the rate of re-attempts can be reduced, for example down to a predetermined minimum rate, to thereby reduce battery consumption in the mobile device. On the other hand, if the user and/or his/her mobile device appear to be still moving/relocating by speeds greater than a predetermined threshold and/or by distances greater than the desired degree of resolution (e.g., 2 feet), then the rate of connection re-attempting 635 may have to be increased, for example up to a predetermined maximum rate for sake of keeping track of where the user is and/or for predicting where the user is heading towards and/or predicting when the user will arrive at a pre-scheduled provisioning spot (e.g., 262f,g).

If the result of reconnection attempting step 635 is that no TID is returned, then path 237a is instead taken. For sake of security, some operating systems (e.g., that of the Apple iPhones™) automatically repeatedly change their hardware address code (HAC) on a semi-random basis. Thus, if no TID is returned at reconnection attempting step 635, the likelihood is that the targeted personal mobile device has changed (e.g., rotated) its current HAC. The new HAC will have been automatically determined in step 622 (which is carried out repeatedly for sake of finding other in-venue devices) and used for invoking the first BPS of the mobile device, receiving the TID and storing the result in the local database. Step 638 represents the recognition that this change of HAC has happened and represents an updating of the database to erase the cross association between the TID and the old and now obsolete HAC while reconfiguring the process to instead use the new HAC. Control may then be passed via flow path 637b to step 635 (or alternatively to bypass 635 and proceed along flow path 636) so the loop continues until the order management system determines at step 639 that the goods and/or services have been provided to the tracked user.

After the requested goods and/or services have been satisfactorily provided to the tracked user, flow path 640 is followed to step 642 where the tracking BPSs are automatically deleted from the user's personal mobile device and the TID is automatically deleted from the local database. This deletion step 642 assures that the BPSs and TID are ephemeral objects which disappear after the order has been fulfilled. As a result, the system stops tracking the user because no TID is returned when step 624 later attempts to reconnect to that personal mobile device. The user's privacy is therefore secured in that the details of the delivered order can no longer be found using the temporarily assigned TID.

Figure 6B:
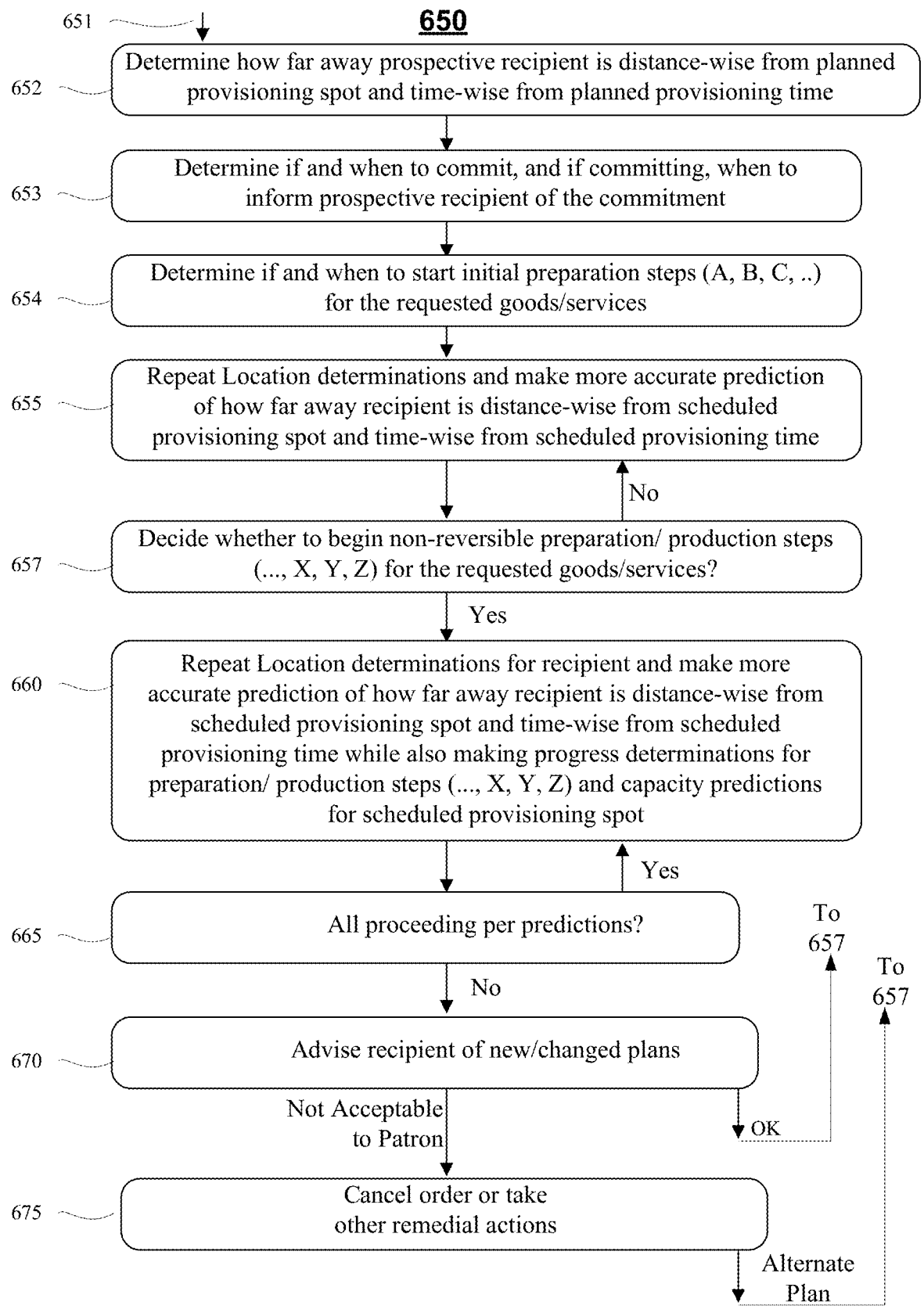
FIG. 6B is a flow chart of a method for determining whether to commit to provisioning of requested goods/services and if committed to, assuring that the provisioning will substantially coincide with arrival of the respective recipient.

Referring to FIG. 6B, further aspects of the order management process is depicted as machine-implemented method 650. Entry may be made at step 651. In step 652 the method automatically determines which location determining method (e.g., telephony, GPS, WiFi hot spots, fine resolution scanners) can provide the finest level of resolution and uses it to determine how far away an identified prospective recipient is distance-wise from a currently planned provisioning spot and timewise from a currently planned provisioning time (e.g., appointment time). The recipient is referred to as being prospective because no commitment has yet been made to provide the goods/services. The place and time of provisioning is still in a changeable planning state rather than in scheduled and committed to states.

In subsequent step 653, the determined separation distance (e.g., effective distance) and/or determined chronological separation is used for determining if and when to commit to fulfilling the online-made request for the goods/services. In one embodiment, the decision to commit is postponed to a later time. If the commitment is made, in one embodiment, a further decision uses the determined distance (e.g., effective distance) and/or determined chronological separation to decide when (e.g., and optionally how) to inform the recipient (and/or order-placer) of the commitment. There can be instances where probability of fulfilling the order changes (e.g., is trending towards increasing or decreasing based on states of other orders) and the establishment wishes to delay its internal commitment and/or the informing of the recipient as to the commitment until a computed probability of fulfilling the order and/or its trend cross predetermined thresholds.

In subsequent step 654, the determined separation distance (e.g., effective distance) and/or determined chronological separation is used for determining if and when to start initial preparation steps (e.g., A, B, C, . . . of block 274) for the corresponding order.

In subsequent step 655, the selecting of the best available, recipient's-location determining method is repeated and the selected method is used to make more accurate predictions of how far away the recipient is distance-wise from the scheduled provisioning spot and/or timewise from the scheduled provisioning time.

In subsequent step 657, a determination is made as whether to begin non-reversible actions with respect to the requested provisioning of the TID-identified goods/services (e.g., start cooking the raw materials) based on the most recent determination and/or prediction of where the prospective recipient is located and how long it would take for the prospective recipient to arrive at an appropriate or acceptable provisioning spot (e.g., 262f and/or 262g). If the result of the determination in step 657 is No, control is returned to step 655 for repeated location and separation determinations as well as optionally, predicting where the recipient next will be and how long it will take to arrive at a prospective provisioning spot.

If the result of the determination in step 657 is Yes, the non-reversible actions are begun with respect to further preparation and/or production steps (e.g., . . . , X, Y, Z of block 278) for corresponding provisioning of the goods/services at the scheduled time (e.g., notification 428 of FIG. 4B) and planned provisioning spot (e.g., notification 429 of FIG. 4B). In one embodiment, the commitment to, or confirmation of the order/request is made at this time and the recipient is informed of this commitment and/or confirmation (e.g., notification 424 of FIG. 4B) and In subsequent step 660, while the further preparation and/or production steps are proceeding, the location determining and predicting steps are repeated, preferably at finer levels of resolution (especially as the recipient gets closer and closer to the planned provisioning spot) and at the same time determination's and predictions are repeatedly made for completion of the finalizing preparation and/or production steps (e.g., . . . , X, Y, Z of block 278) to verify that the requested goods/services will likely to a relatively high probability (e.g., better than 67%) be provided at the planned provisioning spot and scheduled provisioning time. Additionally, predictions are made with respect to capacity for accommodating the arriving recipient at the planned provisioning spot so that the recipient will not encounter unacceptably long queuing lines and/or queuing times when arriving at the planned provisioning spot (e.g., quick pickup drive-through lane).

In subsequent step 665, the results of step 660 are analyzed to determine if current measurements for progress of the recipient and for progress of the in-preparation and/or in-production goods/services are proceeding substantially as predicted and/or planned for. If Yes, control is returned to step 660 for further measurement taking and predicting until the provisioning of the requested goods/services completes (shortly after which point the tracking ceases and the TID for the order is retired). On the other hand, if test step 665 indicates that one or more of the predictions will not be met (No), control advances to step 670 where the recipient is advised of changes to the current plans and optionally asked whether these changes are acceptable. An example of a notification of changed plans may be seen in notification blocks 434 and 439 of FIG. 4C. An example of where additional options are given to the recipient are implied by notification block 449 of FIG. 4D. the recipient may accept the proposed changes as is; in which case control returns to step 657 where commitment to the revised plans is made and corresponding preparation and/or production steps are pursued. Alternatively, if the recipient does not accept the initially proposed change of plans, control advances to step 675 where the recipient is given various other options including for example the possibility of canceling the order, of receiving some form of goodwill compensation for the inconvenience and of picking alternate goods/services in place of the originally requested ones. If the recipient accepts or selects one of the offered alternate options, control returns to step 657 where commitment to the revised plans is made and corresponding preparation and/or production steps are pursued.

In accordance with various embodiments of the present disclosure, the methods described herein may be implemented using one or more hardware computer systems that execute software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a digital processor of a digital programmable computer or other programmable data processing apparatus to produce a machine, such that the instructions, which execute via the processor of the computer or other programmable instruction execution apparatus, create a mechanism for implementing the functions/acts specified in the flowchart and/or block diagram block or blocks. All instructions need not be executed a by same one processor and can instead be distributed among a plurality of operatively cooperative processors. The terminology, 'at least one processor' as used herein is to be understood as covering both options, namely having one processor execute the all instructions or distributing the instructions for execution by two or more processors.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously or on an interrupted multi-tasking basis and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claimed subject matter.

What is claimed is:

1. A method responsive to locations of prospective recipients of online requested goods/services, the method carried out by or on behalf of a prospective provider of the requested goods/services and comprising:

assigning a unique and temporary transaction identification sequence (TID) to a prospective recipient and to goods/services requested to be provided to the prospective recipient at a provisioning spot at which the goods/services are planned to be provided;

sending the assigned TID to a mobile device of the prospective recipient for temporary storage in the mobile device, where the sent TID is deleted from the mobile device when a transaction associated with the TID completes upon providing the requested goods/service;

repeatedly determining a location of the mobile device based on repeated wireless transmissions from the mobile device, the wireless transmissions including the assigned and temporarily stored TID;

repeatedly determining separation between the prospective recipient and the planned provisioning spot based on the repeatedly determined location of the mobile device;

repeatedly determining whether to commit to providing the requested goods/services, where the determination on whether to commit is based on the repeatedly determined location of the mobile device and its corresponding separation from the planned provisioning spot; and in response to determining to not yet commit, withholding notification to the prospective recipient that a commitment has been made to provide the requested good/services.

2. The method of claim 1, and further comprising:

in response to determining to commit, informing the prospective recipient of the commitment to providing the requested goods/services.

3. The method of claim 2, and further comprising:

in response to the repeatedly determined separation of the prospective recipient from the planned provisioning spot, determining when to commit to providing the requested goods/services and when to inform the prospective recipient of the commitment.

4. The method of claim 2 wherein said informing the prospective recipient of the commitment includes at least one of:

sending the prospective recipient a textual notification of the commitment; and sending the prospective recipient an audio notification of the commitment.

5. The method of claim 2 wherein said informing the prospective recipient of the commitment includes at least one of:
notifying the prospective recipient of a scheduled time or time window for the providing of the requested goods/services;
notifying the prospective recipient of a scheduled place for the providing of the requested goods/services; and
notifying the prospective recipient of a planned method for the providing of the requested goods/services.

6. The method of claim 5 and further comprising:
notifying the prospective recipient of a change in at least one of the scheduled time or time window for the providing of the requested goods/services, the scheduled place of providing and the planned method of providing.

7. The method of claim 1, and further comprising:
in response to determining to commit, determining when to begin at least one of non-reversible preparations and non-reversible production for providing the requested goods/services at the planned provisioning spot and within a scheduled time window.

8. The method of claim 7 and further comprising:
in response to a most recent determined separation, determining how much further to continue with at least one of preparations and production for providing the requested goods/services at the planned provisioning spot and within a scheduled time window.

9. The method of claim 7 wherein the scheduled time window for the provisioning of the requested goods/services includes or precedes a predicted time for when the prospective recipient will arrive at the planned provisioning spot.

10. The method of claim 9 wherein the requested goods/services decay in quality after completion of preparations and production and wherein the scheduled time window does not precede the predicted time for when the prospective recipient will arrive at the planned provisioning spot.

11. The method of claim 10 wherein the requested goods/services include a providing of hot and/or chilled food items.

12. The method of claim 1 wherein repeatedly determining of the location of the mobile device based on wireless transmissions from the mobile device includes use of at least two of:
cellular telephony information;
GPS information;
WiFi communications; and
Bluetooth™ communications.

13. The method of claim 12 wherein repeatedly determining of the location of the mobile device based on repeated wireless transmissions from the mobile device includes use of at least one of said WiFi communications and said Bluetooth™ communications.

14. The method of claim 1 wherein repeatedly determining of the location of the mobile device based on wireless transmissions by the mobile device comprises:
obtaining a current hardware address of the detected mobile device;
using the obtained current hardware address to repeatedly attempt to dynamically connect to a predetermined background peripheral service (BPS) installed in the mobile device, where the BPS is configured to output a wireless signal including the temporary transaction identification sequence (TID) when the BPS is connected to, the TID being one that has been pre-assigned to the BPS;
receiving at one or more of scanners installed at a venue having the planned provisioning spot, the wireless signal output by the BPS;
determining a strength of the received wireless signal and acquiring the TID provided within the received wireless signal;
sending the determined signal strength and acquired TID to at least one of plural data processors;
processing the sent signal strength by at least one of the data processors to thereby determine a location of the detected mobile device to within a predetermined spatial resolution; and
outputting by at least one of the data processors a location signal representing the determined location and identification of the detected mobile device.

15. The method of claim 14, wherein the BPS is configured to go to sleep after outputting the wireless signal including the TID.

16. The method of claim 14, wherein the current hardware address of the detected mobile device is one that is occasionally automatically changed by the detected mobile device, the method further comprising:
generating, by at least one of the data processors, a logical association between the acquired TID and the current hardware address of the detected mobile device.

17. The method of claim 14, wherein the obtaining of the current hardware address of the detected mobile device is based on the mobile device autonomously advertising its presence wirelessly, the autonomously produced advertisement including the current hardware address of the mobile device.

18. The method of claim 17, wherein a bit position of the current hardware address of the mobile device within the autonomously produced advertisement is displaced by a predetermined distance from a consistent signature portion of the advertisement and the obtaining of the current hardware address of the detected mobile device includes searching for the signature portion and then locating the current hardware address at its respective bit position using the predetermined distance.

19. The method of claim 14, wherein the wireless signal output by the BPS is a Bluetooth™ signal.

20. The method of claim 14, wherein the predetermined spatial resolution is about one meter or less.

21. The method of claim 14, and further comprising:
determining when the transaction is complete and in response to the determined completion, erasing at least one of the TID and the BPS.

22. An apparatus that is responsive to locations of prospective recipients of online requested goods/services that are requested to be provided at planned provisioning spots, the online requested goods/services to be provided by a prospective provider of the requested goods/services, the apparatus comprising:
at least one of plural processors controlled by the prospective provider and operating to assign a temporary transaction identification sequence (TID) to a prospective recipient and to a transaction involving the requested goods/services of the prospective recipient that are requested online to be provided by the prospective provider at a respective planned provisioning spot, the assigned TID being one that is unique to the online requested goods/services and one that is deleted when the transaction completes upon providing the requested goods/service;

at least one of plural processors controlled by the prospective provider and operating to download the assigned TID into a location revealing mobile device of the prospective recipient;

at least one of plural processors controlled by the prospective provider and operating to repeatedly determine a location of the location revealing mobile device based on wireless transmissions by the mobile device, the transmissions providing the assigned TID;

based on the repeatedly determined location, at least one of plural processors operating to determine how far away the prospective recipient is from the planned provisioning spot in terms of at least one of radial distance, effective distance and chronological distance;

at least one of plural processors responding to at least one of the determined distance-wise and/or timewise separations of the prospective recipient from the planned provisioning spot, and operating to determine whether to commit to providing the requested goods/services;

at least one of plural processors responding to the determination to commit, and responsively informing the prospective recipient of the commitment; and at least one of plural processors responding to completion of the transaction by deleting the TID from the mobile device.

23. A computer system comprising one or more processors and a memory having collectively stored therein instructions that, when executed by the one or more processors, cause the one or more processors to:

assign a temporary transaction identification sequence (TID) to a prospective recipient and to a transaction involving a prospective provider and goods/services requested online by the prospective recipient to be provided by the prospective provider at a respective planned provisioning spot, the assigned TID being one that is unique to the online requested goods/services and one that is deleted when the transaction completes upon the prospective provider providing the requested goods/service;

download the assigned TID into a location revealing mobile device of the prospective recipient;

repeatedly determine a location of the location revealing mobile device based on wireless transmissions by the mobile device, the transmissions providing the assigned TID;

based on the repeatedly determined location, determine how far away the prospective recipient is from the planned provisioning spot in terms of at least one of radial distance, effective distance and chronological distance;

in response to at least one of the determined distance-wise and/or timewise separations of the prospective recipient from the planned provisioning spot, determine whether the prospective provider will commit to providing the requested goods/services;

in response to determining to commit, inform the prospective recipient of the commitment;

and in response to completion of the transaction, deleting the TID from the mobile device.

* * * * *